(12) United States Patent
Sugiyama

(10) Patent No.: US 7,289,676 B2
(45) Date of Patent: Oct. 30, 2007

(54) IMAGE PROCESSING APPARATUS, IMAGE PROCESSING METHOD, IMAGE PROCESSING PROGRAM, AND RECORDING MEDIUM

(75) Inventor: Akira Sugiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 846 days.

(21) Appl. No.: 10/473,494

(22) PCT Filed: Mar. 28, 2002

(86) PCT No.: PCT/JP02/03063

§ 371 (c)(1),
(2), (4) Date: Sep. 26, 2003

(87) PCT Pub. No.: WO02/080575

PCT Pub. Date: Oct. 10, 2002

(65) Prior Publication Data

US 2004/0114816 A1 Jun. 17, 2004

(30) Foreign Application Priority Data

Mar. 29, 2001 (JP) ............................. 2001-095298
May 25, 2001 (JP) ............................. 2001-156818

(51) Int. Cl.
*G06K 9/36* (2006.01)

(52) U.S. Cl. ..................................... 382/239

(58) Field of Classification Search ................ 382/232, 382/236, 238–239, 248, 250, 251; 375/240.03, 375/240.05, 240.12, 240.15, 240.16, 240.18, 375/240.2, 240.24, 240.25, 240.28
See application file for complete search history.

(56) References Cited

U.S. PATENT DOCUMENTS 5,699,119 A * 12/1997 Chung et al. .......... 375/240.04
5,778,099 A * 7/1998 Suzuki ....................... 382/239
6,192,075 B1 * 2/2001 Jeng et al. .................. 375/240
6,480,539 B1 * 11/2002 Ramaswamy .......... 375/240.03
6,885,702 B1 * 4/2005 Goudezeune et al. .. 375/240.12

FOREIGN PATENT DOCUMENTS

| JP | 7-95564 | 4/1995 |
| JP | 8-18959 | 1/1996 |
| JP | 11 346365 | 12/1999 |
| JP | 2000-138938 | 5/2000 |

* cited by examiner

*Primary Examiner*—Jose L. Couso
(74) *Attorney, Agent, or Firm*—Frommer Lawrence & Haug LLP; William S. Frommer

(57) ABSTRACT

Activities are normalized corresponding to a characteristic of a pattern of a frame. The picture quality is optimized by adaptive quantization. A normalized activity norm_act [m] of each macro block is obtained with an average activity avg_act of the frame and the activity act [m] of each macro block according to the following formulas (1) and (2). In the following formulas, att is a parameter, for example att=0.125.

$$\text{norm\_gain} = \text{att} \times \text{avg\_act} + 1 \quad (1)$$

$$\text{norm\_act}[m] = \{(\text{norm\_gain} \times \text{act}[m] \times \text{act}[m]) + (\text{avg\_act} \times \text{avg\_act})\} \div \{(\text{act}[m] \times \text{act}[m]) + (\text{norm\_gain} \times \text{avg\_act} \times \text{avg\_act})\} \quad (2)$$

Thus, the normalized activities norm_act [m] are normalized in the range from 1/norm_gain to norm_gain. Since norm_gain is proportional to the average activity avg_act, when a picture has a flat pattern whose average activity avg_act is small, the normalizing range becomes small. Thus, the quantized values of macro blocks are not largely different. As a result, the picture is equally quantized. In contrast, when a picture has a complex pattern whose average activity avg_act is large, the normalizing range becomes large. Thus, the quantized values of macro block are largely different. As a result, a macro block having a flat pattern is finely quantized, whereas a macro block having a complex pattern is coarsely quantized.

17 Claims, 22 Drawing Sheets

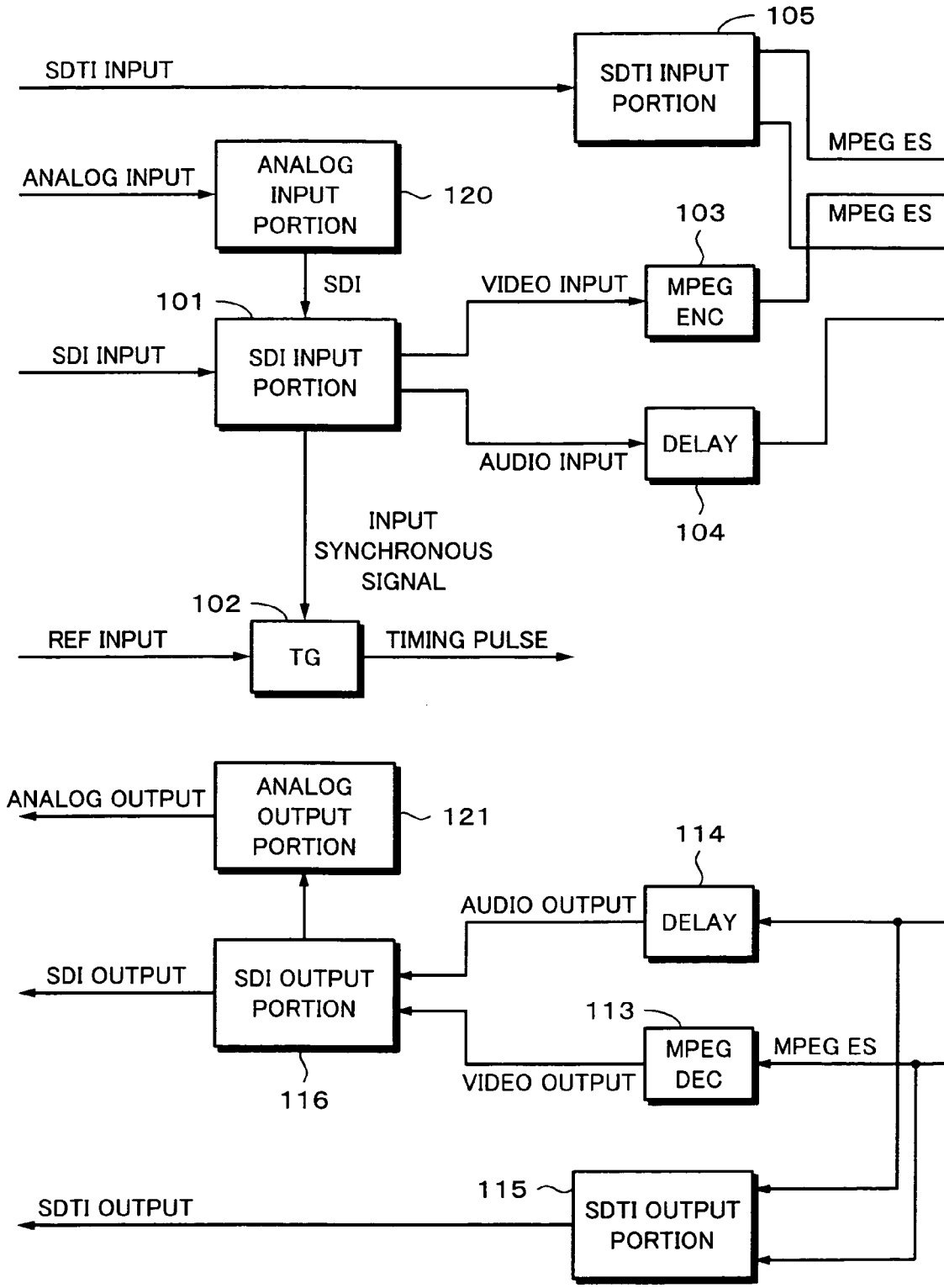

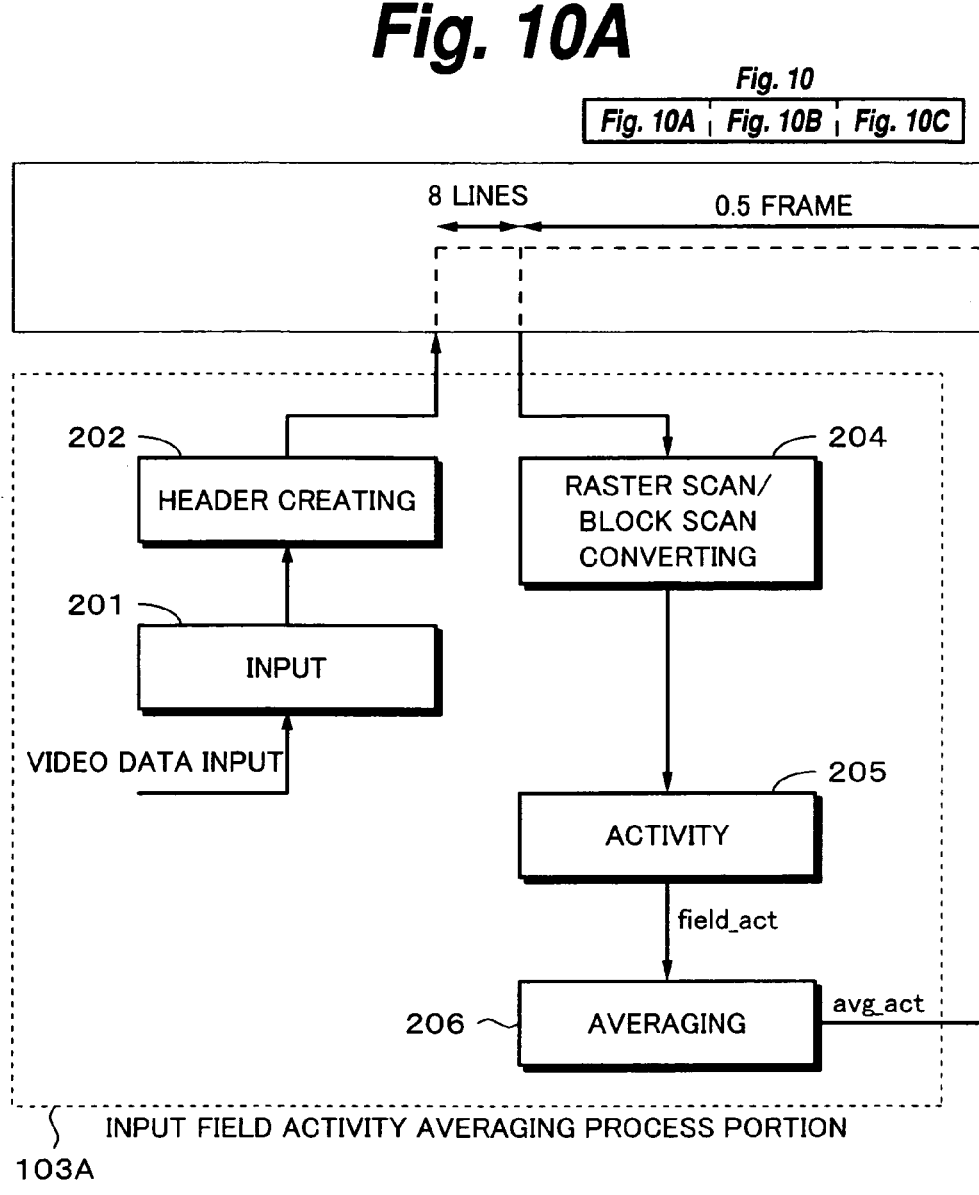
Fig. 10A
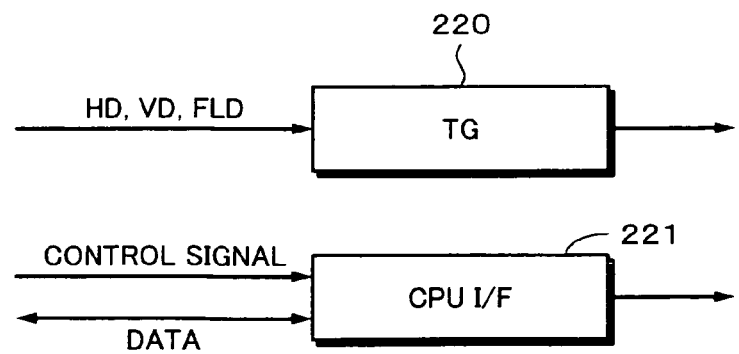

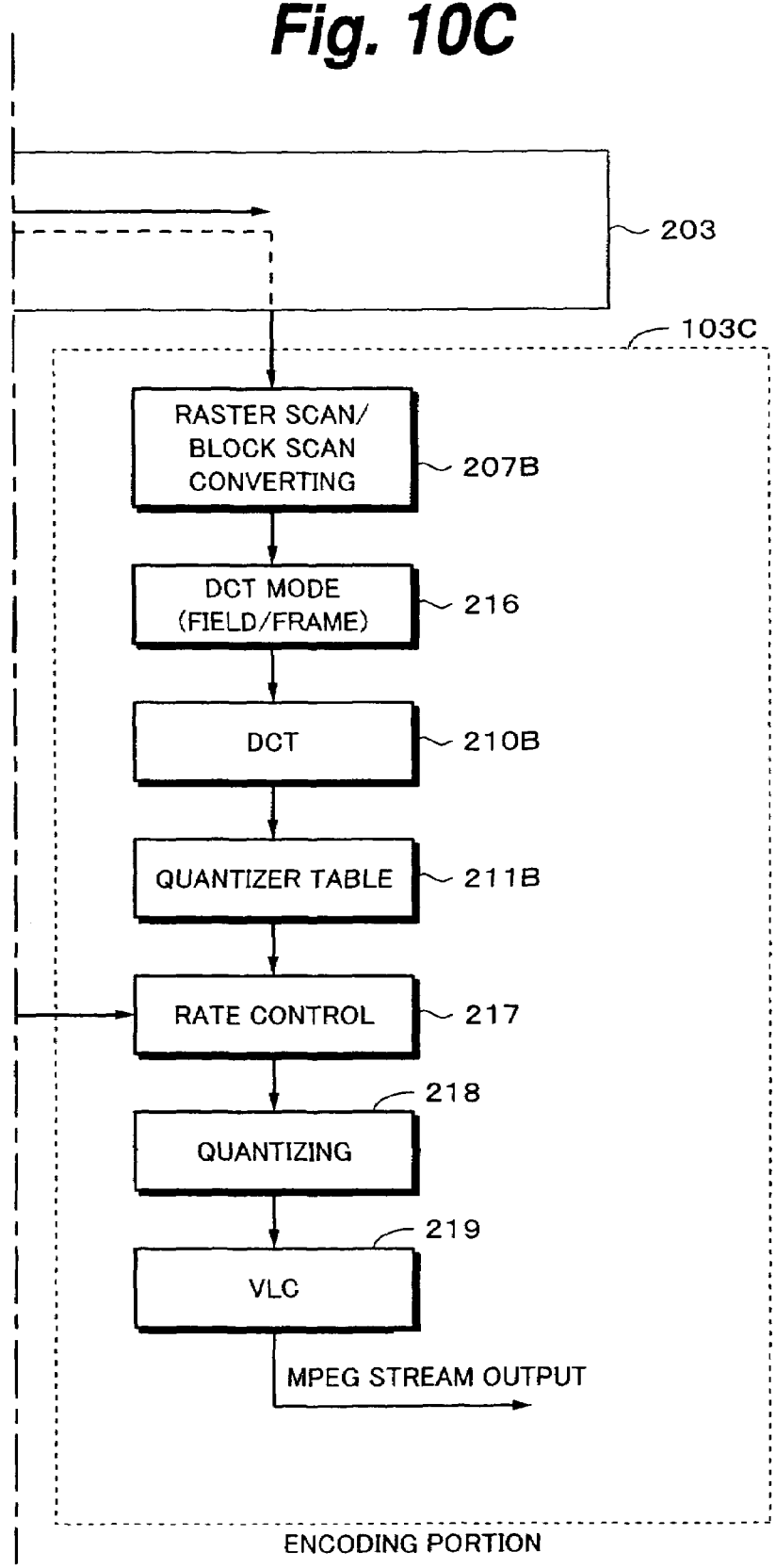

IMAGE PROCESSING APPARATUS, IMAGE PROCESSING METHOD, IMAGE PROCESSING PROGRAM, AND RECORDING MEDIUM

TECHNICAL FIELD

The present invention relates to a picture processing apparatus, a picture processing method, a picture processing program, and a recording medium for controlling a generated code amount in compression encoding for a picture signal using quantization of each block of the picture signal so that the code amount of each frame does not exceed a predetermined amount.

BACKGROUND ART

In a conventional compression-encoding system that compresses and encodes picture data, picture data is quantized in the unit of one block composed of a predetermined number of pixels. For example, in the MPEG2 (Moving Pictures Experts Group 2), such a compression-encoding system is used. In the MPEG2, picture data is transformed in the DCT (Discrete Cosine Transform) method in the unit of one block composed of a predetermined number of pixels. The obtained DCT coefficients are quantized. As a result, the picture data is compression-encoded. In the MPEG2, with a quantizer step designated with a quantizer scale, DCT coefficients are compressed and encoded.

Conventionally, in the MPEG2 compression-encoding, a method for calculating an index referred to as activity that represents complexity or smoothness of a picture to be compressed and optimizing the picture quality using adaptive quantization corresponding to the activity is known.

This method is performed as follows. When the compressing process is performed for a simple and smooth picture region, the deterioration of the picture quality is obstructive. In this region (referred to as flat region), the picture data is finely quantized with a quantizer scale whose quantizer step is small. In contrast, when the compressing process is performed for a complex picture region, the deterioration of the picture quality is not obstructive. In this region, the picture data is coarsely quantized with a quantizer scale whose quantizer step is large. Thus, with a limited code amount, the picture quality can be effectively optimized.

When picture data is compressed, as was described above, each picture region is divided into pixel blocks each having a predetermined size. The picture data is quantized and transformed using the DCT method in the unit of one pixel block. The MPEG2 standard prescribes a block of eight pixels×eight lines as the minimum process unit. In addition, the MPEG2 standard prescribes that each block of eight pixels×eight lines should be transformed using the DCT method and that the resultant DCT coefficients should be quantized in the unit of one macro block of 16 pixels×16 lines.

On the other hand, although the MPEG2 standard does not clearly prescribe a unit for calculating the forgoing activity, however, the MPEG2 TM5 (Test Model 5) has proposed that the activity should be processed in the unit of one sub block of eight pixels×eight lines, which is the same as one DCT block.

Next, the activity calculating method in "adaptive quantization considering visual characteristic" that has been used in the MPEG2 TM5 will be described.

The adaptive quantization is to vary a quantizer scale Qj corresponding to the state of a picture with an activity of each macro block so as to control a generated code amount of for example one frame and improve the picture quality. The quantizer scale Qj is varied with an activity so that in a flat region, where the deterioration of the picture quality is obstructive, the picture data is quantized with a quantizer scale Qj whose quantizer step is small and in a complex picture region, where the deterioration of the picture quality is not obstructive, the picture data is quantized with a quantizer scale Qj whose quantizer step is large.

An activity is calculated with pixel values of a luminance signal of an original picture rather than a predictive error. In other words, an activity is calculated with pixel values of a total of eight blocks that are four blocks in the frame DCT encoding mode and our blocks in the field DCT encoding mode. For example, an activity $act_j$ of a j-th macro block is obtained by calculating the following Formulas (1) to (3) in the reverse order (namely, in the order of Formula (3), Formula (2), and Formula (1)).

$$act_j = 1 + \min[sblk=1, 8](var\_sblk) \quad (1)$$

$$var\_sblk = 1/64 \; \Sigma[k=1, 64](P_k - Pavg)^2 \quad (2)$$

$$Pavg = 1/64 \; \Sigma[k=1, 64] P_k \quad (3)$$

where $P_k$ is a pixel value of a block of a luminance signal of the original picture. In Formula (3), 64 pixel values of a block of 8×8 are summed and the result is divided by 64. As a result, an average value Pavg of pixel values $P_k$ of the block is obtained. Next, in Formula (2), the difference between the average value Pavg and each pixel value $P_k$ is obtained. As a result, average difference values var_sblk of the block of 8×8 are calculated. In Formula (1), with the minimum value of the average difference values var_sblk, an activity $act_j$ of the j-th macro block is obtained. The minimum value is used because even if a part of the macro block contains a flat portion, it is necessary to finely quantize the macro block.

In the MPEG2 TM5, a normalized activity $Nact_j$ that has values in the range from "2.0" to "0.5" is obtained from activities $act_j$ of macro blocks corresponding to the following Formula (4).

$$Nact_j = (2 \times act_j + avg\_act)/(act_j + 2 \times avg\_act) \quad (4)$$

where "avg_act" represents an average value (average activity) of activities $act_j$ of an encoded frame immediately preceded by a frame (picture) that is currently being processed.

A quantizer scale $mquant_j$ that considers a visual characteristic is given by the following Formula (5) corresponding to a quantizer scale $Q_j$ that is obtained for controlling a generated code amount of one frame.

$$mquant_j = Q_j \times Nact_j \quad (5)$$

When each macro block is quantized with such a quantizer scale $mquant_j$, while the code amount of one whole frame is kept in a predetermined range, each macro block is optimally quantized corresponding to flatness and complexity of a picture of the frame. As a result, while a limited code amount is effectively used, the picture is effectively compressed with much suppression of the picture quality.

When normalization is performed according to the MPEG2 TM5, a normalized activity $Nact_j$ is obtained by the forgoing Formula (4). In other words, whatever pattern a frame has, the normalization ranges from "0.5" to "2.0". Thus, in a frame having for example a flat pattern, quantized values of individual macro blocks largely vary.

On the other hand, in a frame having a complex pattern, a macro block of a complex portion uses a lat of a code amount. Thus, a macro block of a relatively flat pattern portion uses a limited code amount. As a result, the picture quality of a macro block having a flat pattern whose deterioration tends to be obstructive deteriorates.

The deterioration of the picture quality becomes remarkable especially when the compression rate is low and the code amount is relatively affordable.

Therefore, an object of the present invention is to provide a picture processing apparatus, a picture processing method, a picture processing program, and a recording medium for normalizing an activity corresponding to a characteristic of a pattern of a frame and optimizing the picture quality using adaptive quantization.

DISCLOSURE OF THE INVENTION

To solve the forgoing problem, the present invention is a picture processing apparatus, comprising average activity calculating means for calculating an average activity with picture data; normalized activity calculating means for dynamically designating a normalizing range corresponding to the average activity calculated by the average activity calculating means and calculating a normalized activity with the average activity in the normalizing range; and quantizing means for quantizing the picture data with the normalized activity calculated by the normalized activity calculating means.

In addition, the present invention is a picture processing method, comprising the steps of calculating an average activity with picture data; dynamically designating a normalizing range corresponding to the average activity calculated at the average activity calculating step and calculating a normalized activity with the average activity in the normalizing range; and quantizing the picture data with the normalized activity calculated at the normalized activity calculating step.

In addition, the present invention is a picture processing program for causing a computer apparatus to execute a picture processing method for quantizing picture data, the picture processing method comprising the steps of calculating an average activity with picture data; dynamically designating a normalizing range corresponding to the average activity calculated at the average activity calculating step and calculating a normalized activity with the average activity in the normalizing range; and quantizing the picture data with the normalized activity calculated at the normalized activity calculating step.

In addition, the present invention is a recording medium on which picture processing program for causing a computer apparatus to execute a picture processing method for quantizing picture data has been recorded, the picture processing method comprising the steps of calculating an average activity with picture data; dynamically designating a normalizing range corresponding to the average activity calculated at the average activity calculating step and calculating a normalized activity with the average activity in the normalizing range; and quantizing the picture data with the normalized activity calculated at the normalized activity calculating step.

As was described above, according to the present invention, a normalizing range is dynamically designated corresponding to an average activity calculated with input picture data. Corresponding to the normalizing range, with the average activity, a normalized activity is calculated. With the calculated normalized activity, picture data is quantized. Thus, picture data can be quantized corresponding to a characteristic thereof.

BRIEF DESCRIPTION OF DRAWINGS

FIG. 9A and FIG. 9B are a block diagram showing an example of a structure of a digital VTR according to an embodiment of the present invention;

FIG. 10A, FIG. 10B, and FIG. 10C are a block diagram more practically showing an example of a structure of an MPEG encoder;

BEST MODES FOR CARRYING OUT THE INVENTION

Figure 1:
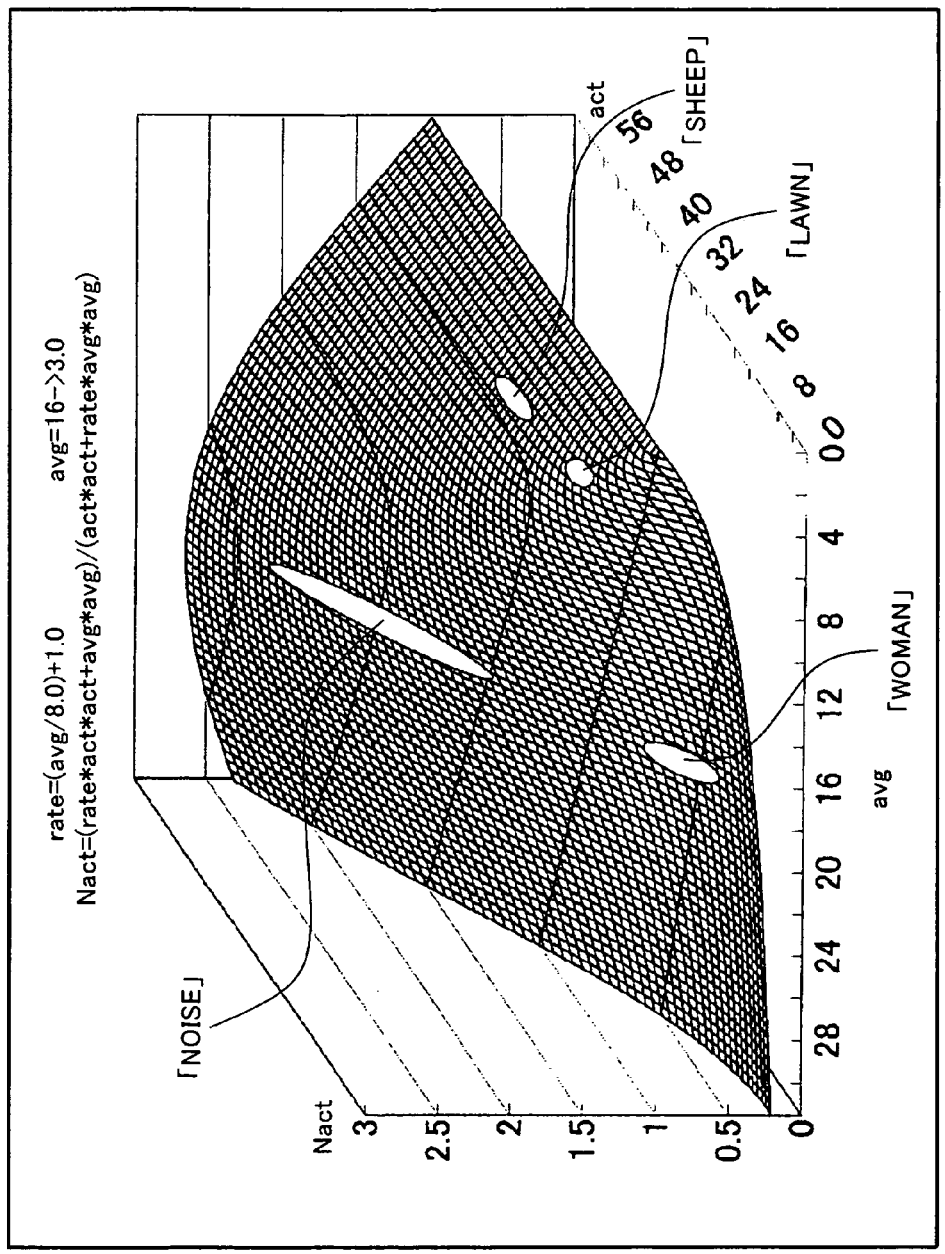
FIG. 1 is a graph showing an example of a characteristic of a formula that expresses normalization of a second example.

Next, an embodiment of the present invention will be described. According to the present invention, a normalized activity in a target range is obtained by dynamically varying a normalizing range corresponding to a characteristic of a picture in the target range, for example, flatness and complexity in the target range, in other words, an average activity. Corresponding to the normalized activity, the picture in the target range is quantized.

When a frame is a target range, if the whole frame is a flat pattern, the normalizing range of activities is narrowed. Thus, with activities that are equal on the whole picture, it can be quantized. As a result, with equal flatness on the whole picture, a high picture quality can be obtained. In contrast, when one frame is a picture that has both a complex region and a flat region, the normalizing range of activities is widened. As a result, a large code amount is assigned to a flat region in which noise is obstructive. In contrast, a complex region in which noise is not obstructive is coarsely quantized. As a result, a picture that has visibly high quality can be obtained.

More practically, as a first example, when an average activity of one frame is denoted by avg_act and an activity of a macro block having a macro block address m is denoted by act [m], a normalized activity norm_act [m] is calculated corresponding to the following Formula (6) and Formula (7).

$$\text{norm\_gain} = \text{att} \times \text{avg\_act} + 1 \qquad (6)$$

$$\text{norm\_act}[m] = \{\text{norm\_gain} \times \text{act}[m] + \text{avg\_act}\} \div \{\text{act}[m] + \text{norm\_gain} \times \text{avg\_act}\} \qquad (7)$$

In Formula (6) and Formula (7), when both act [m] and avg_act become 0, since the denominator becomes 0, it is treated as norm_act [m]=1. In addition, att is a parameter. For example, att=0.125 is assigned.

In Formula (7), a value norm_gain is substituted for coefficient "2" of Formula (4) in the normalized activity calculating method according to the MPEG TM5. In Formula (7), with activity act [m]=0, the relation of normalized activity norm_act [m]=1/norm_gain is obtained. On the other hand, when an activity act [m] is much larger than the average activity avg_act, a normalized activity norm_act [m] becomes close to the value norm_gain. In other words, a normalized activity norm_act [m] of each macro block is normalized in the range from 1/norm_gain to norm_gain.

As expressed in Formula (6), the value norm_gain is proportional to the average activity avg_act. Thus, the normalizing range of a frame having a flat pattern, whose average activity avg_act is small, is narrow. As a result, without a large difference of quantized values of macro blocks, the frame is equally quantized. In contrast, the normalizing range of a frame that has a complex pattern, whose average activity is large, becomes large. Thus, the difference of quantized values of macro blocks becomes large. Thus, a macro block having a flat pattern is finely quantized, whereas a macro block having a complex pattern is coarsely quantized.

As a second example, an expression of which the activity act [m] on the dividend side of Formula (7) of the first example is squared and the average activity avg_act on the divisor side thereof is squared may be used. The calculating method for a normalized activity norm_act [m] of a macro block is expressed by Formula (8) and Formula (9). The meanings of terms of Formula (8) and Formula (9) are the same as those of Formula (6) and (7).

$$\text{norm\_gain} = \text{att} \times \text{avg\_act} + 1 \qquad (8)$$

$$\text{norm\_act}[m] = \{(\text{norm\_gain} \times \text{act}[m] \times \text{act}[m]) + (\text{avg\_act} \times \text{avg\_act})\} \div \{(\text{act}[m] \times \text{act}[m]) + (\text{norm\_gain} \times \text{avg\_act} \times \text{avg\_act})\} \qquad (9)$$

In Formula (8) and Formula (9), when both act [m] and avg_act become 0, since the denominators thereof become 0, it is assumed that norm_act [m]=1. In addition, att is a parameter. In this example, att=0.125 is assigned.

Like in Formula (6) and Formula (7) of the first example, in Formula (8) and Formula (9) the second example, a normalized activity norm_act [m] of a macro block is in the range from 1/norm_gain to norm_gain. Thus, like in the first example, when a picture has a flat pattern whose average activity avg_act is small, the picture is equally quantized. When a picture has a complex pattern whose average activity avg_act is large, quantized values of macro blocks become large.

In the second example, each of the activity act [m] on the dividend side and the average activity avg_act [m] on the divisor side is squared unlike with the first example. Thus, as the average activity avg_act and an activity act [m] of a macro block vary, the difference of the normalized activities norm_act [m] becomes larger than those of the first example. Consequently, a more preferred result can be obtained from the second example than the first example. Next, focused on the second example, the normalization will be described.

Figure 2:
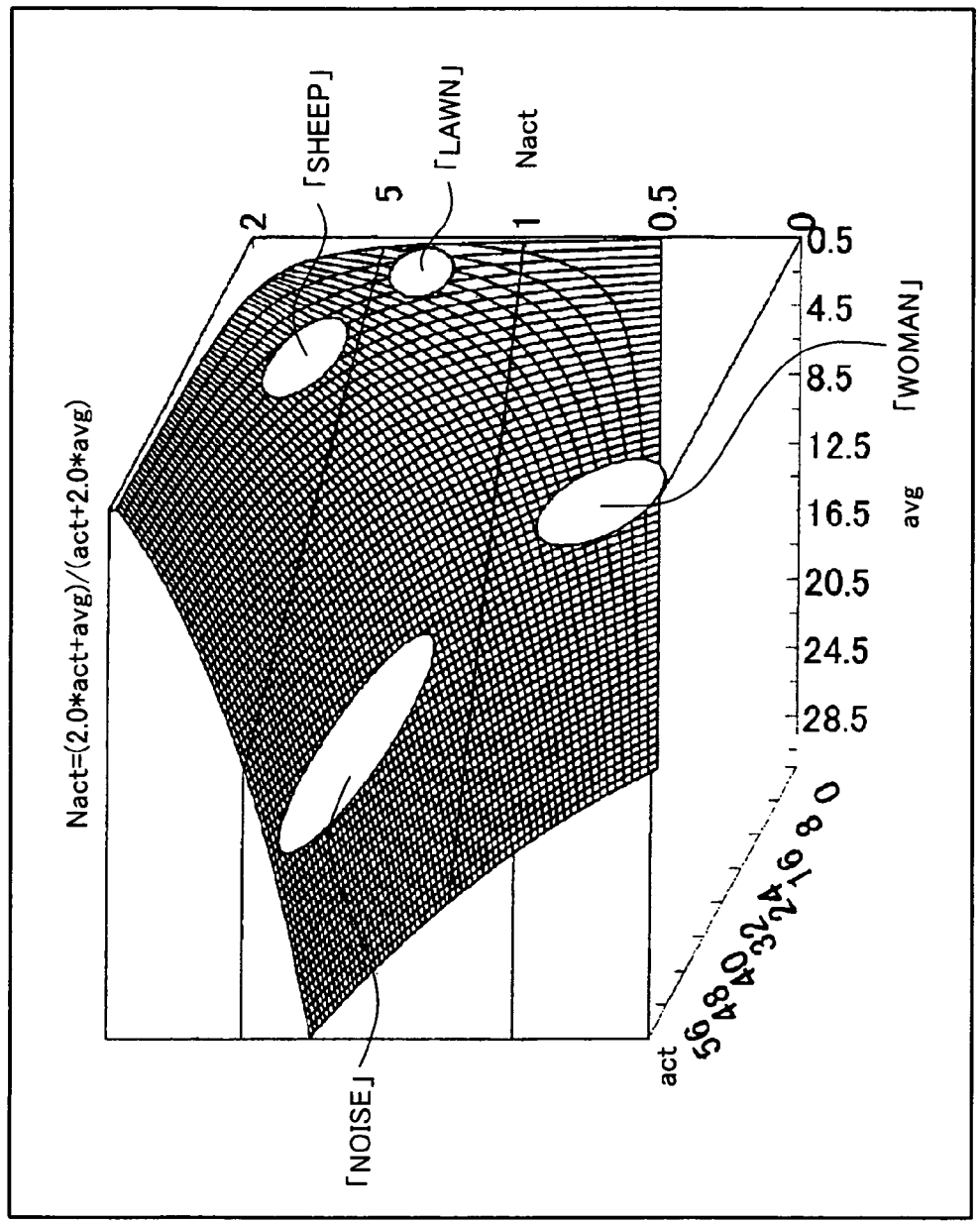
FIG. 2 is a graph showing an example of a characteristic of normalization according to the MPEG TM5.

FIG. 1 is a graph showing an example of a characteristic of Formula (8) and Formula (9), which express the normalization of the second example. FIG. 2 is a graph showing an example of a characteristic of Formula (4), which expresses the normalization according to the MPEG TM5 described in the section of the Related Art. In FIG. 1 and FIG. 2, X axis, Y axis, and Z axis represent average activity avg_act, activity act [m], and normalized activity norm_act [m], respectively. Ranges "woman", "noise", "sheep", and "lawn" shown in FIG. 1 and FIG. 2 represent ranges of normalized activities norm_act [m] of corresponding portions of sample pictures shown in FIG. 3 and FIG. 4.

Figure 3:
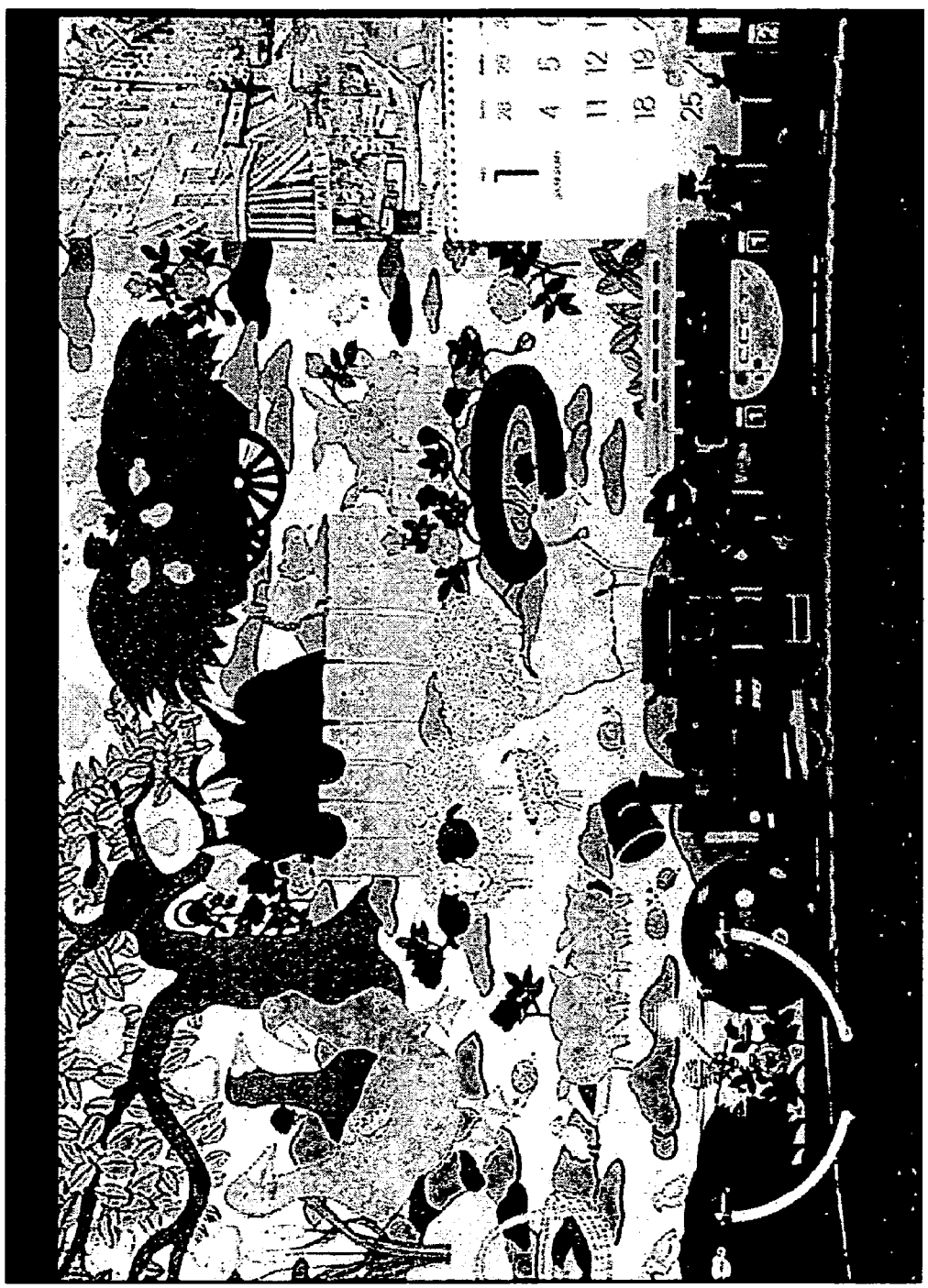
FIG. 3 is a schematic diagram showing an example of a flat pattern.
Figure 4:
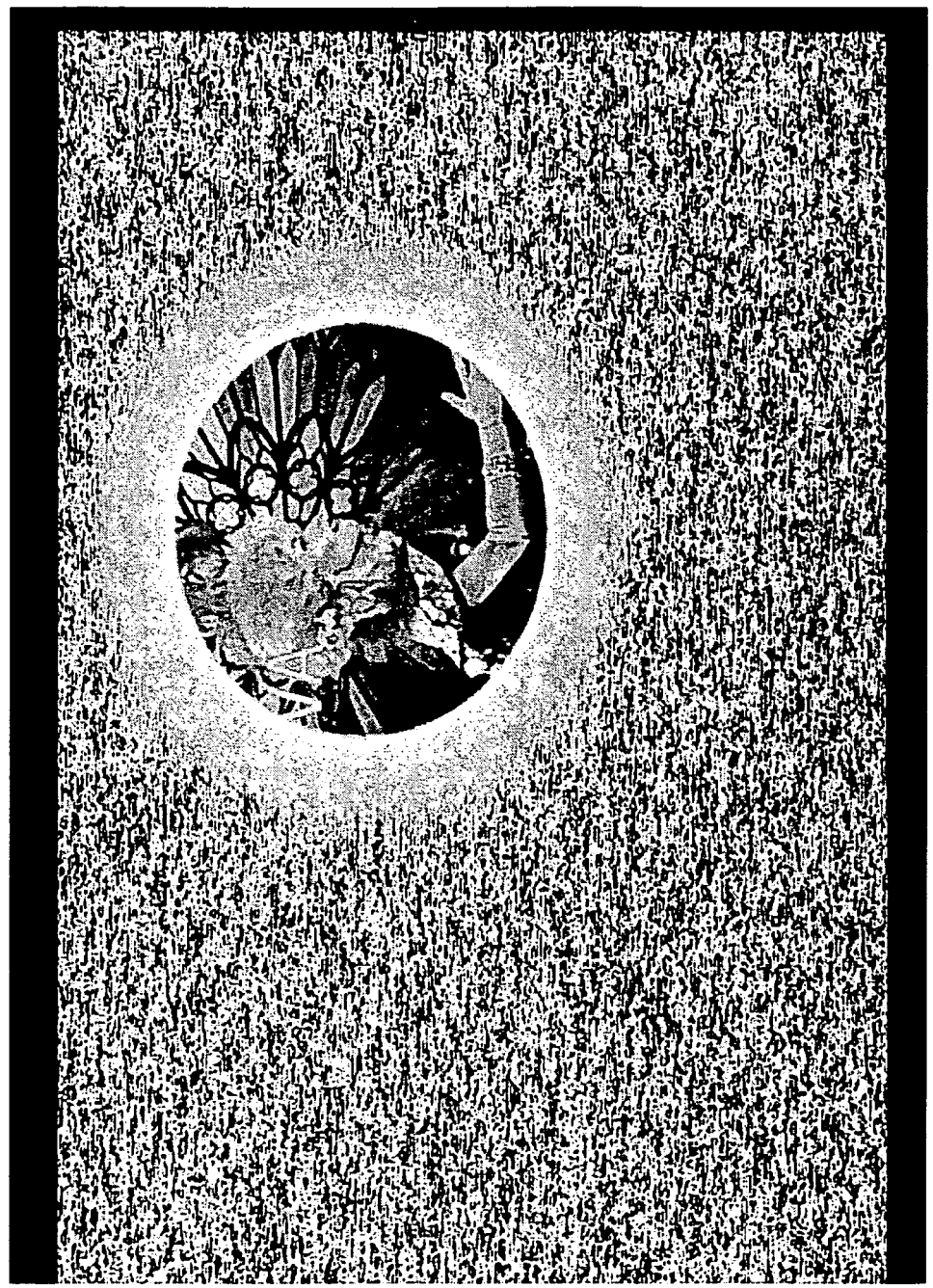
FIG. 4 is a schematic diagram showing an example that contains both a complex pattern and a flat pattern.

FIG. 3 shows an example of a picture wholly composed of a flat pattern. In particular, a pattern of the background of the picture is composed of a figure painted with one or several colors. It can be said that the picture has a simple structure. The "lawn" and "sheep" portions are parts of the background. FIG. 4 shows an example of a picture that has both a complex pattern and a flat pattern. In FIG. 4, the "woman" portion is hemmed at a center portion. The "noise" portion surrounds the hemmed "woman" portion. As in the picture shown in FIG. 3, the "woman" portion has a relatively flat pattern. However, the "noise" portion around the "woman" portion has a low correlation with an adjacent portion in the level of pixels. Thus, the "noise" portion has a complex pattern.

In FIG. 1, when the average activity avg_act is "0", the normalized activity norm_act is 1. When the average activity avg_act is 16, norm_gain becomes 3. Thus, it is clear that the normalized activity norm_act [m] distributes in the range from $\frac{1}{3}$<norm_act [m]<3. In FIG. 1, norm_gain is denoted by rate.

Since FIG. 2 shows only 64 activities act [m], the range of the average activity is not clear. However, whatever the average activity avg_act has, it is clear that the normalized activity norm_act [m] distributes in the normalized range of $\frac{1}{2}$<norm_act [m]<2.

When the pictures shown in FIG. 1 and FIG. 2 are compared, it is clear that a wide range is assigned to the normalized activity norm_act [m] for "noise", which is a complex pattern, whereas a narrow range is assigned to the normalized activity norm_act [m] for "woman", which is a relatively flat pattern. In contrast, in FIG. 2 according to the MPEG TM5, a similar range is assigned to the normalized activity norm_act [m] for both "noise" and "woman". On the other hand, the range of the normalized activity norm_act [m] assigned for the flat patterns "sheep" and "lawn" shown in FIG. 1 according to the present invention is smaller than that shown in FIG. 2 according to the MPEG TM5.

Figure 5:
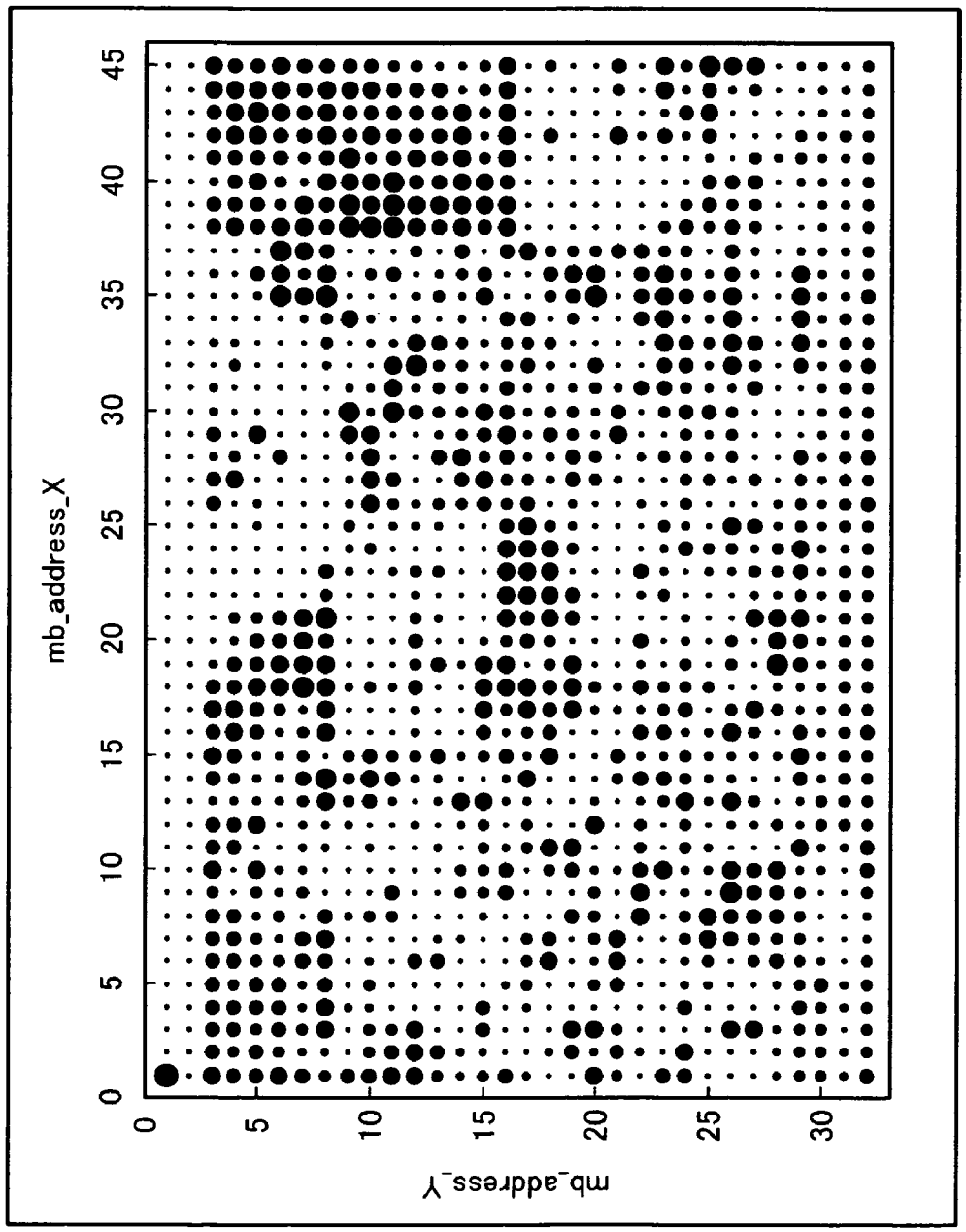
FIG. 5 is a schematic diagram showing an example of a normalized activity of which a picture of a flat pattern is normalized according to the MPEG TM5.
Figure 6:
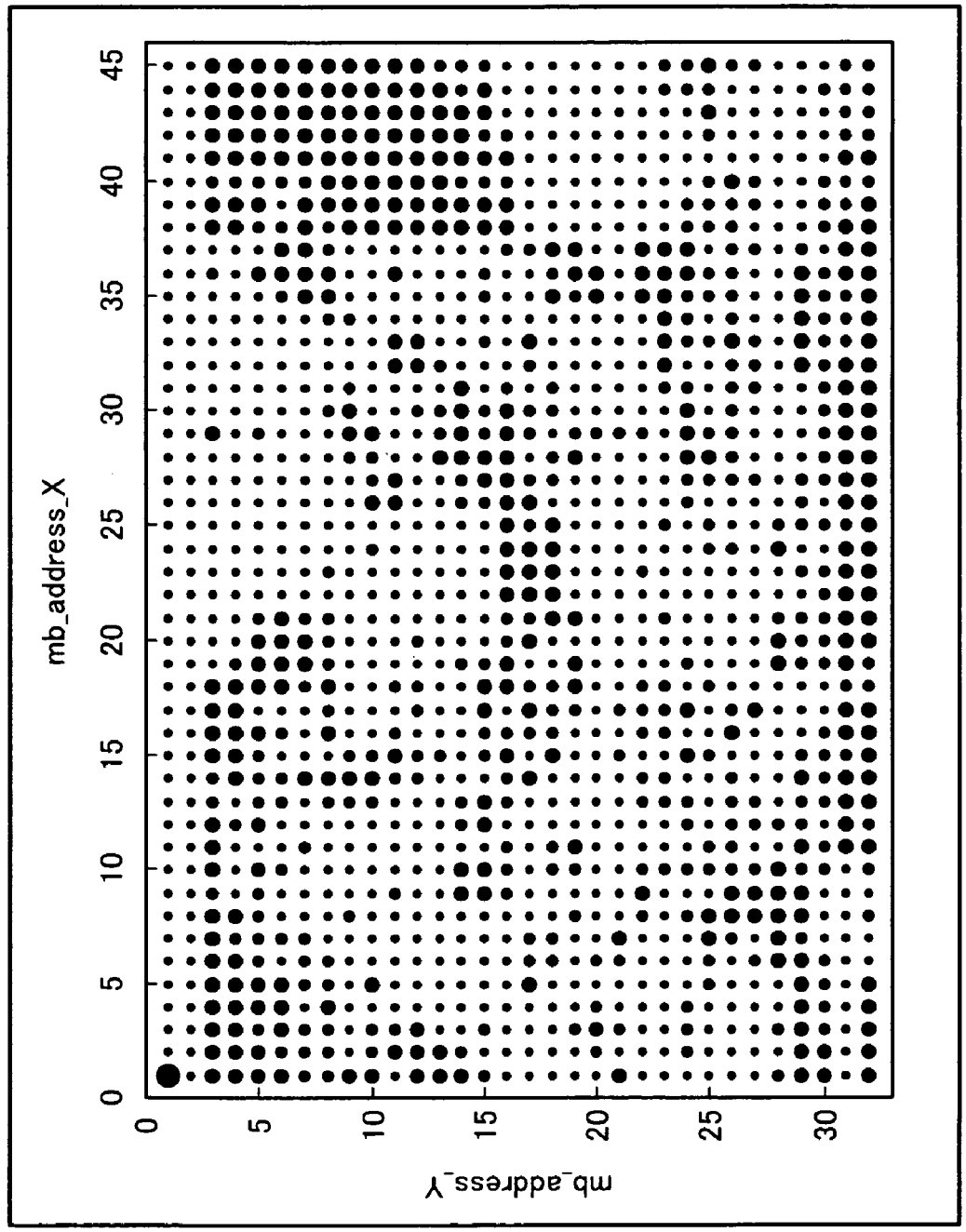
FIG. 6 is a schematic diagram showing an example of a normalized activity of which a picture wholly composed of a flat pattern is normalized according to the present invention.

FIG. 5 to FIG. 8 show distributions of the normalized activities norm_act [m] according to the MPEG TM5 and of the normalized activities norm_act [m] according to the present invention for the sample pictures shown in FIG. 3 and FIG. 4. In FIG. 5 to FIG. 8, diameters of "● (black circles)" relatively represent values of the normalized activities norm_act [m] at corresponding positions (macro blocks) of the pictures. FIG. 5 and FIG. 6 correspond to FIG. 3, whereas FIG. 7 and FIG. 8 correspond to FIG. 4.

The average activity avg_act of the picture shown in FIG. 3 is around 3. On the other hand, the average activity avg_act of the picture shown in FIG. 4 is around 16.

FIG. 5 shows an example of normalized activities norm_act [m] for the picture shown in FIG. 3 that is normalized according to the conventional MPEG TM5. In FIG. 5, a normalized activity norm_act [m] of a macro block having a flat picture (a non-character portion of a calendar and a foreside portion of a train) is small. on the other hand, a normalized activity norm_act [m] of a macro block having a complex picture (for example, a picture portion of a calendar and a tree portion at an upper left portion) is large. As the whole picture, it is clear that the normalized activities norm_act [m] largely vary with individual macro blocks.

Especially when the compression rate is low and the code amount is relatively affordable, the quantized values of macro blocks largely vary. Thus, as the picture quality of a whole picture becomes high, the difference of picture quality of macro blocks can be clearly detected.

FIG. 6 shows an example of normalized activities norm_act [m] for the picture shown in FIG. 3 that is normalized according to the present invention. It is clear that the deviation of sizes of "(black circles)" is small and that the values of the normalized activities norm_act [m] are relatively equal in the whole picture in comparison with the picture shown in FIG. 5. In other words, it is clear that the value of a normalized activity norm_act [m] of a macro block having a flat picture is not largely different from that of a macro block having a complex picture in comparison with the example of the picture shown in FIG. 5. In the adaptive quantization, since macro blocks are quantized with quantized values proportional to values of the normalized activities norm_act [m]. Thus, the whole picture is relatively equally quantized.

Figure 7:
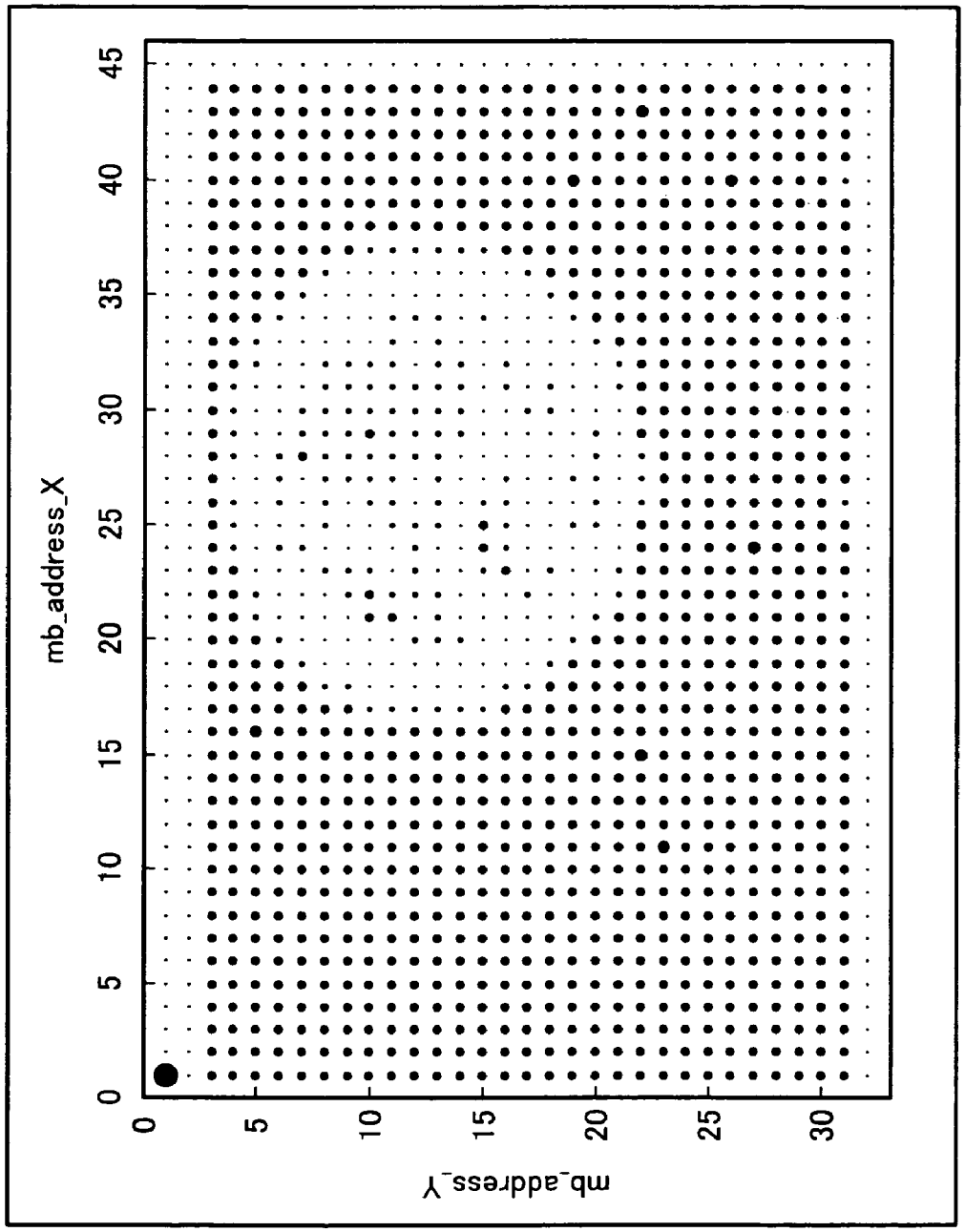
FIG. 7 is a schematic diagram showing an example of a normalized activity of which a picture having both a complex pattern and a flat pattern is normalized according to the MPEG TM5.

Next, an example of which the average activity avg_act is large as shown in FIG. 4 will be described. FIG. 7 shows an example of normalized activities norm_act [m] for the picture shown in FIG. 4 normalized according to the MPEG TM5 as the related art. In FIG. 7, the rates of diameters of "● (black circles)" that represent the values of normalized activities norm_act [m] are different from those shown in FIG. 5.

As in FIG. 5, in FIG. 7, the value of a normalized activity norm_act [m] of a macro block having a flat picture (for example, a "woman" portion) is small, whereas the value of a normalized activity norm_act [m] of a macro block having a complex picture (a "noise" portion) is large. Thus, it is clear that the values of the normalized activities norm_act [m] vary with macro blocks.

However, in the example shown in FIG. 7, a macro block that has a very complex picture such as the "noise" portion uses a lot of a code amount. As a result, the code amount of a macro block that has a flat picture is restricted. Thus, the picture quality of a macro block that has a flat picture whose visual deterioration tends to be obstructive deteriorates.

Figure 8:
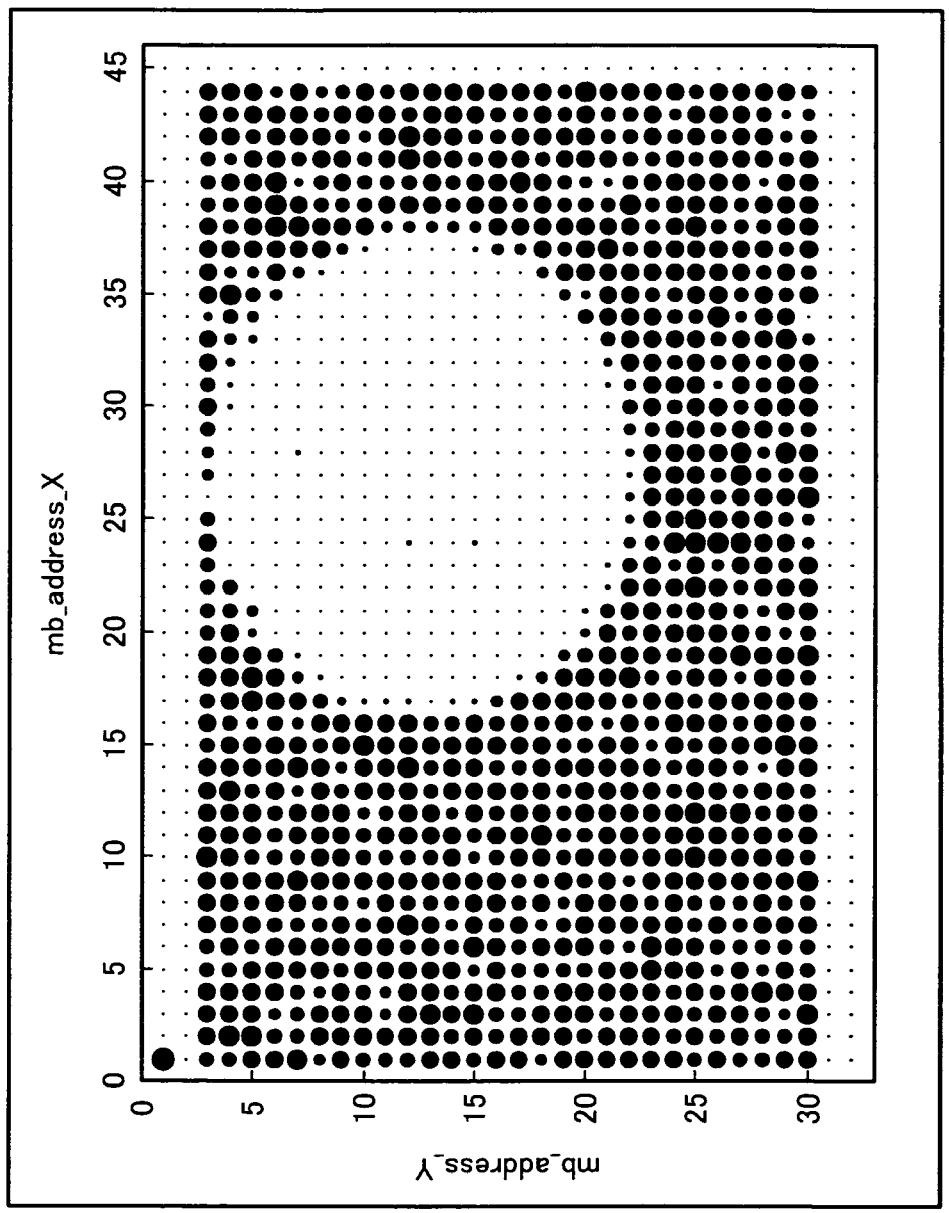
FIG. 8 is a schematic diagram showing an example of a normalized activity of which a picture having both a complex pattern and a flat pattern is normalized according to the present invention.

FIG. 8 shows an example of normalized activities norm_act [m] for the picture shown in FIG. 4 normalized according to the present invention. According to the present invention, the normalizing range of normalized activities norm_act [m] is dynamically varied corresponding to the average activity avg_act of the picture. Thus, when the value of the average activity avg_act is large because the picture is complex (in the example shown in FIG. 4, act_avg≈16), the range of the normalized activities norm_act [m] is for example ⅓<norm_act [m]<3, which is larger than that for a picture whose average activity avg_act is small.

Thus, the value of a normalized activity norm_act [m] of a macro block that has a flat picture is small. In contrast, the value of a normalized activity norm_act [m] of a macro block having a very complex picture such as a noise portion is large. In the example shown in FIG. 8, it is clear that the value of a normalized activity norm_act [m] of a portion having a flat picture is largely different from that of a portion having a very complex picture.

Thus, according to the present invention, the adaptive quantization is varied corresponding to a characteristic such as a pattern of a picture. As a result, an optimum picture quality corresponding to a characteristic of a picture can be obtained.

Figure 9B:
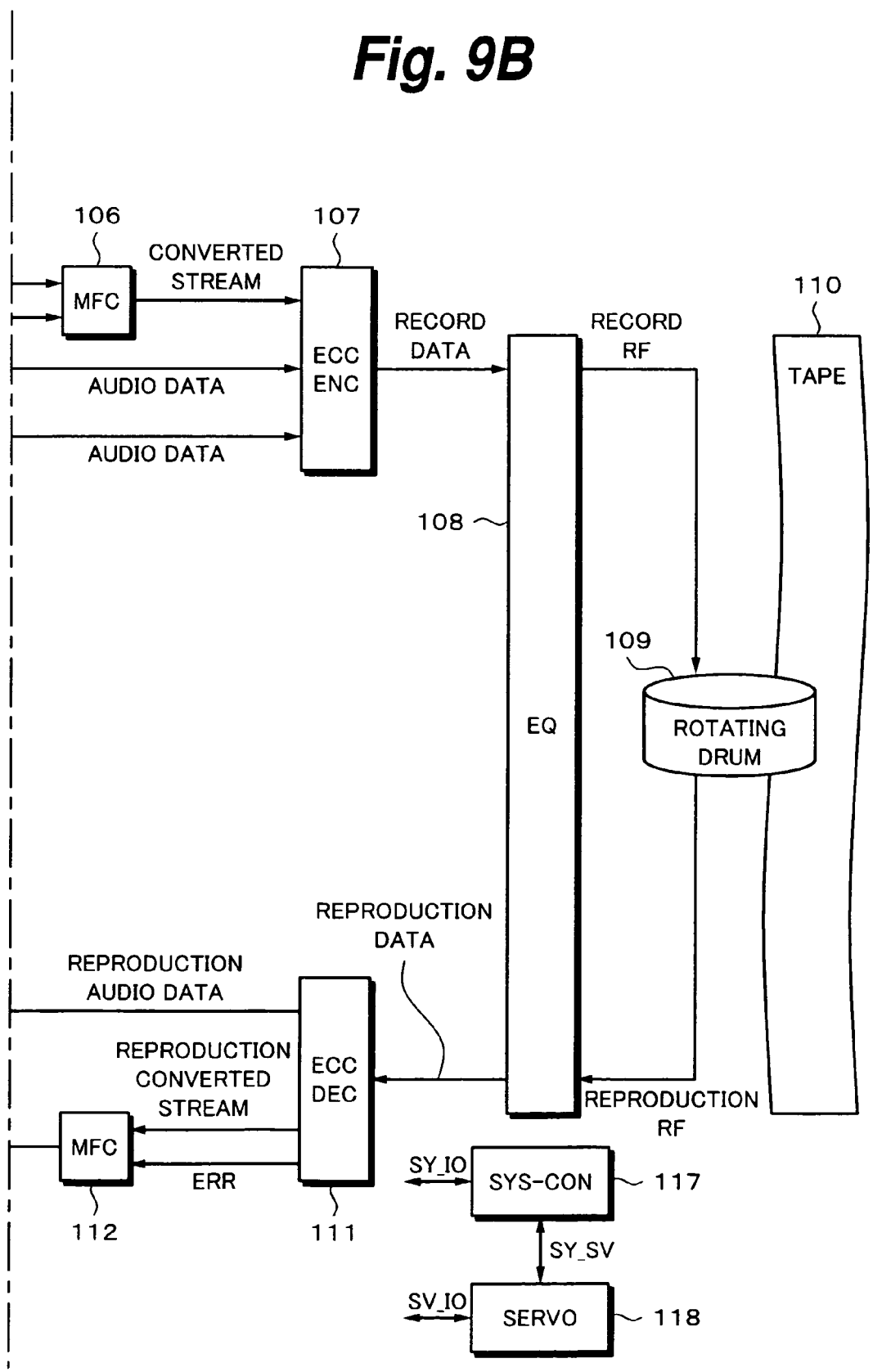

Next, an example of a real structure according to an embodiment of the present invention will be described. FIG. 9A and FIG. 9B show an example of a structure of a digital VTR according to an embodiment of the present invention. The digital VTR can directly record a digital video signal that has been compressed and encoded corresponding to the MPEG system onto a recording medium.

First of all, the structure and the processing operation of a recording system of the digital VTR will be described. Signals that are input from the outside to the recording system are two types of serial digital interface signals that are an SDI (Serial Data Interface) signal and an SDTI (Serial Data Transport Interface) signal, an analog interface signal, and an external reference signal REF that is a control signal.

The SDI is an interface prescribed by the SMPTE so as to transmit a (4:2:2) component video signal, a digital audio signal, and additional data. The SDTI is an interface through which an MPEG elementary stream (referred to as MPEG ES) that is a stream of which a digital video signal has been compression-encoded according to the MPEG system. The ES is 4:2:2 components. As described above, the ES is a stream of all I pictures having the relation of 1 GOP=1 picture. In the SDTI-CP (Content Package) format, the MPEG ES is separated into access units and packed to a packet in the unit of one frame. The SDTI-CP uses a sufficient transmission band (clock rate: 27 MHz or 36 MHz or stream bit rate: 270 Mbps or 360 Mbps). In one frame period, the ES can be transmitted as a burst.

The SDI signal transmitted through the SDI is input to an SDI input portion 101. An analog input signal as an analog video signal is input to an analog input portion 120. The analog input portion 120 converts the analog input signal into a digital signal, maps the digital signal to for example the aforementioned SDI format, and outputs the resultant SDI signal. The SDI signal, where the analog input signal has been converted and mapped to the SDI format, is supplied to the SDI input portion 101.

The SDI input portion 101 converts the supplied SDI signal as a serial signal into a parallel signal. In addition, the SDI input portion 101 extracts an input synchronous signal as an input phase reference from the SDI signal and outputs the extracted input synchronous signal to a timing generator TG 102.

In addition, the SDI input portion 101 separates a video signal and an audio signal from the converted parallel signal. The separated video input signal and audio signal are output to an MPEG encoder 103 and a delay circuit 104, respectively.

The timing generator TG 102 extracts a reference synchronous signal from an input external reference signal REF. In synchronization with a designated one of the reference synchronous signal or the input synchronous signal, which has been supplied from the SDI input portion 101, the timing generator TG 102 generates a timing signal necessary for the digital VTR and supplies it as timing pulses to each block.

The MPEG encoder 103 converts the input video signal into coefficient data according to the DCT method, quantizes the coefficient data, and encodes the quantized data with a variable length code. Variable-length-coded (VLC) data, which has been output from the MPEG encoder 103, is an elementary stream (ES) according to the MPEG2. The elementary stream, which has been output from the MPEG encoder 103, is supplied to one of input terminals of a recording side multi-format converter (hereinafter referred to as recording side MFC).

The delay circuit 104 functions as a delay line that delays the input audio signal as non-compressed signal corresponding to the delay of the video signal of the MPEG encoder 103. The audio signal, which has been delayed by the delay circuit 104, is output to an ECC encoder 107. This is because the digital VTR according to the embodiment of the present invention treats the audio signal as a non-compressed signal.

The SDTI signal supplied from the outside through the SDTI is input to an SDTI input portion 105. The SDTI input portion 105 detects the synchronization of the SDTI signal. The SDTI signal is temporarily buffered and the elementary stream is extracted therefrom. The extracted elementary stream is supplied to the other input terminal of the recording side MFC 106. The synchronous signal, which has been synchronously detected, is supplied to the timing generator TG 102 (not shown).

The SDTI input portion 105 extracts a digital audio signal from the input SDTI signal. The extracted digital audio signal is supplied to the ECC encoder 107.

In the digital VTR according to the present invention, an MPEG ES can be directly input independent from the base band video signal, which has been input from the SDI input portion 101.

The recording side MFC 106 has a stream converter and a selector. The recording side MFC 106 selects one of the MPEG ES supplied from the SDI input portion 101 and the MPEG ES supplied from the SDTI input portion 105, and collects DCT coefficients of DCT blocks of one macro block so that frequency components are rearranged in the order of frequency components. The resultant stream, of which the coefficients of the MPEG ES have been rearranged, is referred to as converted elementary stream. Since the MPEG ES is rearranged, when a search reproduction is performed, as many DC coefficients and low order AC coefficients can be collected as possible, which contributes the improvement of the quality of the search picture. The converted elementary stream is supplied to the ECC encoder 107.

A main memory (not shown) having a large storage capacity is connected to the ECC encoder 107. The ECC encoder 107 has a packing and shuffling portion, an audio outer code encoder, a video outer code encoder, an inner code encoder, an audio shuffling portion, a video shuffling portion, and so forth. In addition, the ECC encoder 107 has an sync block ID adding circuit and a synchronous signal adding circuit. According to the first embodiment of the present invention, as an error correction code for the video signal and audio signal, a product code is used. In the product code, a data symbol is dually encoded in such a manner that the two-dimensional array of the video signal or audio signal is encoded in the vertical direction with an outer code and that the two-dimensional array is encoded in the horizontal direction with an inner code. As the outer code and inner code, the Reed-Solomon code can be used.

The converted elementary stream, which has been output from the recording side MFC 106, is supplied to the ECC encoder 107. In addition, the audio signals, which are output from the SDTI input portion 105 and the delay circuit 104, are supplied to the ECC encoder 107. The ECC encoder 107 shuffles the converted elementary stream and audio signals, encodes them with an error correction code, adds IDs and a synchronous signal to sync blocks, and outputs the resultant signal as record data.

The record data, which has been output from the ECC encoder 107, is converted into a record RF signal by the equalizer EQ 108 that has a recording amplifier. The record RF signal is supplied to a rotating drum 109. The rotating drum 109 records the record signal on a magnetic tape 110. The rotating drum 109 has a rotating head disposed in a predetermined manner. In reality, a plurality of magnetic heads whose azimuths are different from each other and that form adjacent tracks are disposed.

When necessary, the record data may be scrambled. When data is recorded, it may be digitally modulated. In addition, the partial response class 4 and Viterbi code may be used. The equalizer EQ 108 has both a recording side structure and a reproducing side structure.

Next, the structure and the processing operation of the reproducing system of the digital VTR will be described. In the reproduction mode, a reproduction signal that is reproduced from the magnetic tape 110 by the rotating drum 109 is supplied to the reproducing side structure of the equalizer EQ 108 that has a reproducing amplifier and so forth. The equalizer EQ 108 equalizes the reproduction signal and trims the wave shape thereof. When necessary, the equalizer EQ 108 demodulates the digital modulation and decodes the Viterbi code. An output of the equalizer EQ 108 is supplied to an ECC decoder 111.

The ECC decoder 111 performs the reverse process of the ECC encoder 107. The ECC decoder 111 has a main memory having a large storage capacity, an inner code decoder, an audio deshuffling portion, a video deshuffling portion, and an outer code decoder. In addition, the ECC decoder 111 has a deshuffling and depacking portion and a data interpolating portion for video data. Likewise, the ECC decoder 111 has an audio AUX separating portion and a data interpolating portion for audio data.

The ECC decoder 111 detects the synchronization of reproduction data. In other words, the ECC decoder 111 detects a synchronous signal added at the beginning of a sync block and extracts the sync block from the reproduction signal. The ECC decoder 111 corrects an error of each sync block of the reproduction data with an inner code. Thereafter, the ECC decoder 111 performs an ID interpolating process for each sync block. The ECC decoder 111 separates video data and audio data from the reproduction data, where IDs have been interpolated. The ECC decoder 111 deshuffles the video data and audio data so that they are restored to the original data. The ECC decoder 111 corrects an error of the deshuffled data with an outer code.

When the ECC decoder 111 cannot correct an error of data, which exceeds its error correcting performance, the ECC decoder 111 sets an error flag to the data. For an error of video data, the ECC decoder 111 outputs a signal ERR that represents that data has an error.

The reproduction audio data, whose error has been corrected, is supplied to an SDTI output portion 115. A delay circuit 114 delays the reproduction audio data for a predetermined amount and supplies the delayed reproduction audio data to an SDI output portion 116. The delay circuit 114 absorbs the delay of the video data processed in an MPEG decoder 113 that will be described later.

On the other hand, the video data, whose error has been corrected, is supplied as converted reproduction elementary stream to a reproducing side MFC circuit 112. The aforementioned signal ERR is also supplied to the reproducing side MFC circuit 112. The reproducing side MFC circuit 112 performs the reverse process of the recording side MFC 106. The reproducing side MFC circuit 112 has a stream converter. The stream converter performs the reverse process of the recording side stream converter. In other words, the stream converter rearranges DCT coefficients arranged in the order of frequency components to those arranged in the order of DCT blocks. As a result, the reproduction signal is converted into an elementary stream according to the MPEG2. At that point, when the signal ERR is supplied from the ECC decoder 111 to the reproducing side MFC circuit 112, it replaces the corresponding data with a signal that perfectly complies with the MPEG2.

The MPEG ES, which has been output from the reproducing side MFC circuit 112, is supplied to the MPEG decoder 113 and the SDTI output portion 115. The MPEG decoder 113 decodes the supplied MPEG ES so as to restore it to the original video signal, which has not been compressed. In other words, the MPEG decoder 113 performs an inversely quantizing process and an inverse DCT process for the supplied MPEG ES. The decoded video signal is supplied to an SDI output portion 116.

As described above, the audio data, which had been separated from the video data by the ECC decoder 111, has been supplied to the SDI output portion 116 through the delay circuit 114. The SDI output portion 116 maps the supplied video data and audio data in the SDI format so as to convert them into the SDI signal having the SDI data structure. The SDI signal is output to the outside.

On the other hand, as described above, the audio data, which had been separated from the video data by the ECC decoder 111, has been supplied to the SDTI output portion 115. The SDTI output portion 115 maps the video data and audio data as the supplied elementary stream in the SDTI format so as to convert them into the SDTI signal having the SDTI data structure. The SDTI signal is output to the outside.

A system controller 117 (abbreviated as sys-con 117 in FIG. 9A and FIG. 9B) is composed of for example a micro computer. The system controller 117 communicates with each block using a digital signal SY_IO so as to control the entire operation of the digital VTR. A servo 118 communicates with the system controller 117 using a signal SY_SV. Using the signal SV_IO, the servo 118 controls the traveling of the magnetic tape 110 and drives and controls the rotating dram 109.

Figure 10B:
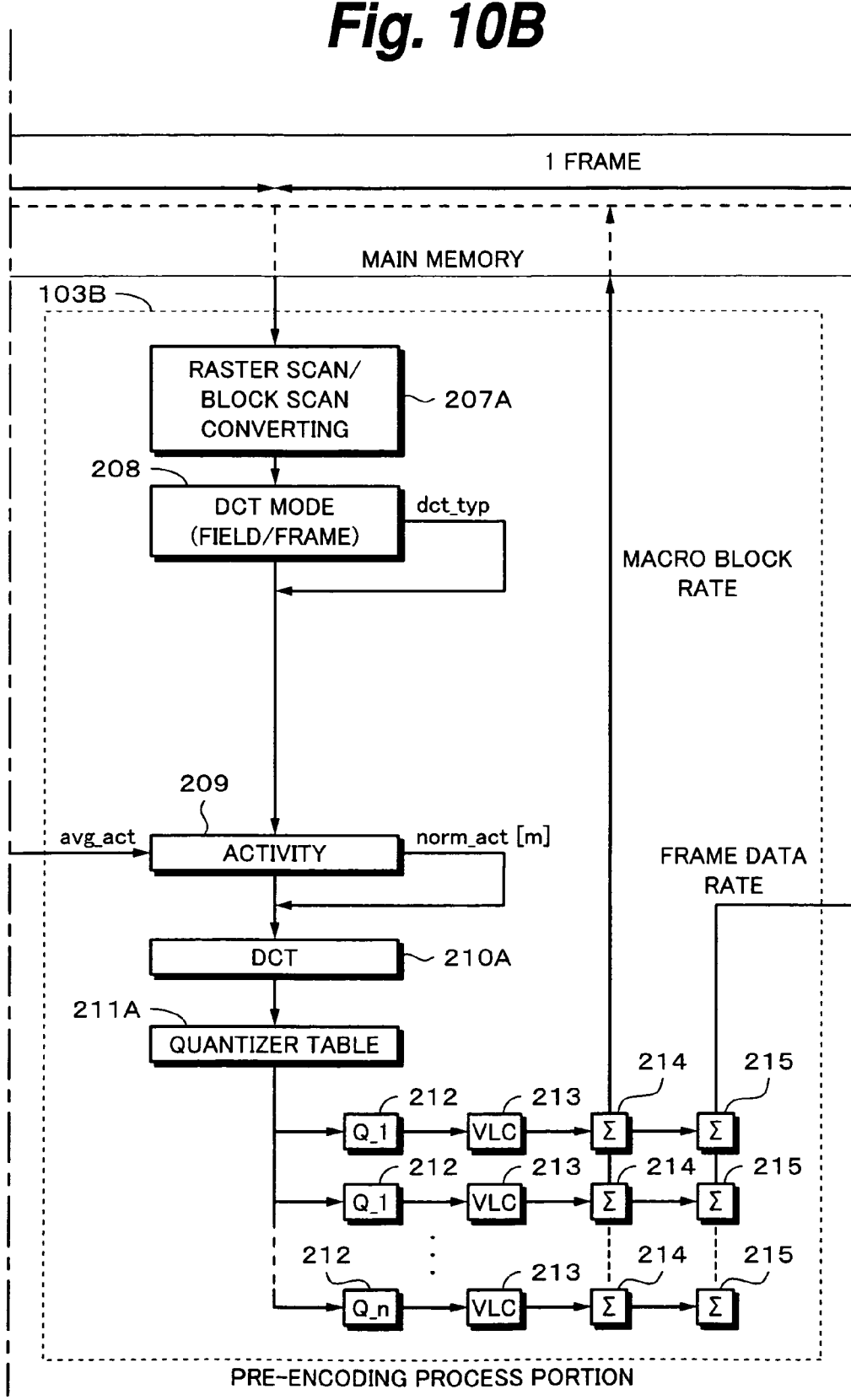

FIG. 10A, FIG. 10B, and FIG. 10C more practically show the structure of the forgoing example of the MPEG encoder. FIG. 11A, FIG. 11B, FIG. 11C, FIG. 12A, FIG. 12B, FIG. 12C, FIG. 13A, FIG. 13B, FIG. 14A, FIG. 14B, FIG. 15A, FIG. 15B, FIG. 15C, FIG. 16A, FIG. 16B, FIG. 16C, and FIG. 17 show examples of the structures of streams transferred in the individual portions of FIG. 10A, FIG. 10B, and FIG. 10C.

The MPEG encoder 103 is composed of an input field activity averaging process portion 103A, a pre-encoding process portion 103B, and an encode portion 103C. The input field activity averaging process portion 103A obtains the average value of activities of the input video data and supplies the obtained average value to the pre-encoding process portion 103B. The pre-encoding process portion 103B estimates the generated code amount of quantized input video data with the average value of the activities. According to the estimated result, while controlling the code amount, the encode portion 103C actually quantizes the input video data, encodes the quantized video data with a variable length code, and outputs the resultant data as an MPEG ES.

A timing generator TG 220 generates a timing signal necessary for the MPEG encoder 103 with a horizontal synchronous signal HD, a vertical synchronous signal VD, and a field synchronous signal FLD that have been supplied from for example the timing generator TG 102 shown in FIG. 9A and FIG. 9B. A CPU I/F block 221 is an interface with the system controller 117 shown in FIG. 9A and FIG. 9B. With a control signal and data transferred through the CPU I/F block 221, the operation of the MPEG encoder 103 is controlled.

First of all, the process of the input field activity averaging process portion 103A will be described. Video data, which has been output from the SDI input portion 101 and input to the MPEG encoder 103, is supplied to an input portion 201. The input field activity averaging process portion 103A converts the video data into data that can be stored in a main memory 203 and checks a parity for the video data. The video data, which has been output from the input portion 201, is supplied to a header creating portion 202. Using a vertical blanking region or the like, headers according to the MPEG, for example sequence_header, quantizer_matrix, and gop_header, are extracted. The extracted headers are stored in the main memory 203. These headers are designated mainly by the CPU I/F block 221. In other than the vertical blanking region, in the header creating portion 202, the video data supplied from the input portion 201 is stored in the main memory 203.

The main memory 203 is a frame memory for a picture. The main memory 203 rearranges video data and absorbs the system delay. The video data is rearranged by for example an address controller (not shown) that controls read addresses of the main memory 203. In FIG. 8A, FIG. 8B, and FIG. 8C, 8 lines, 0.5 frame, and 1 frame in the block of the main memory 203 represent delay values as read timings of the main memory 203. They are properly controlled corresponding to a command issued from the timing generator TG 220.

A raster scan/block scan converting portion 204 extracts macro blocks according to the MPEG from each line of the video data, which has been stored in the main memory 203, and supplies the extracted macro blocks to an activity portion 205 disposed downstream thereof. According to the embodiment, with only the first field, activities are calculated. Thus, the macro blocks that are output from the raster scan/block scan converting portion 204 are composed of video data of the first field.

Figure 11A:
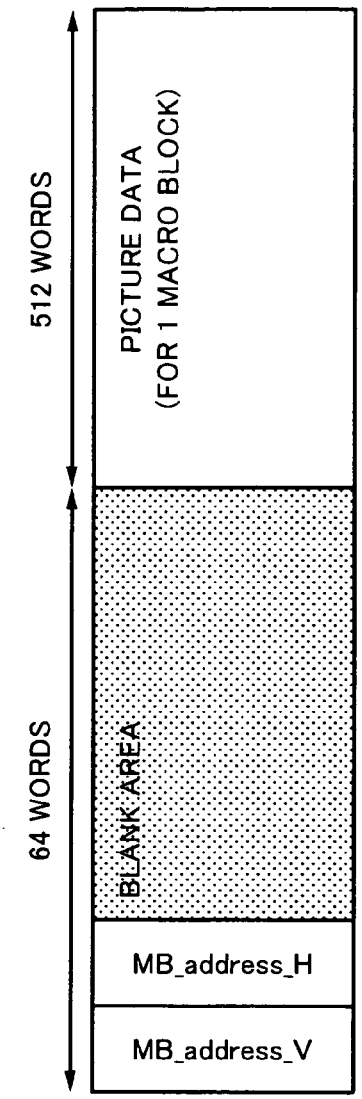
FIG. 11A, FIG. 11B, and FIG. 11C are schematic diagrams showing examples of structures of streams transferred by individual portions of the MPEG encoder.

As shown in FIG. 11A, at the beginning of the stream that is output from the raster scan/block scan converting portion 204, address information of the vertical and horizontal directions of the macro block are placed. The address information is followed by a blank area having a predetermined size, followed by picture data for one macro block.

The stream has a data length of 576 words each of which is composed of for example eight bits. The last 512 words (referred to as data portion) are assigned a picture data area for one macro block. The first 64 words (referred to as header portion) contain the aforementioned address information of the macro block. The other portion is a blank area for data and flags embedded by each portion disposed downstream of the raster scan/block scan converting portion 204.

A macro block according to the MPEG is a matrix of 16 pixels×16 lines. However, the input field activity averaging process portion 103A performs the process for obtaining activities with only the first field. Thus, when eight lines of the first field have been stored in the main memory 203, the process can be started. In reality, corresponding to a command issued from the timing generator TG 220, the process is properly started.

The activity portion 205 calculates an activity of each macro block. In the input field activity averaging process portion 103A, an activity of each macro block of only a first field is calculated. The calculated result is output as a field activity signal field_act. The signal field_act is supplied to the averaging portion 206. The signal field_act is cumulated for one field. As a result, an average value avg act is obtained. The average value avg_act is supplied to the activity portion 209 of the pre-encoding process portion 103B. The activity portion 209 performs a pre-encoding process with the average values av_act of the first and second fields.

Thus, after the average value avg_act of the activities of the first field has been obtained, a pre-encoding process can be performed with the average value in consideration of adaptive quantization.

Next, the pre-encoding process portion 103B will be described. The raster scan/block scan converting portion 207A performs basically the same process as the forgoing raster scan/block scan converting portion 204. However, since the raster scan/block scan converting portion 207A is to perform a pre-encoding process for estimating a code amount, the raster scan/block scan converting portion 207A requires video data of both the first field and the second field. Thus, when eight lines of the second field have been stored in the main memory 203, the raster scan/block scan converting portion 207A can form a macro block having a size of 16 pixels×16 lines, which is dealt with the MPEG. At that point, the raster scan/block scan converting portion 207A can start the process. In reality, the raster scan/block scan converting portion 207A properly starts the process corresponding to a command received from the timing generator TG 220.

Video data that is output from the raster scan/block scan converting portion 207A is supplied to the DCT mode portion 208. The DCT mode portion 208 decides to select a field DCT encoding mode or a frame DCT encoding mode to encode video data.

Figure 11B:
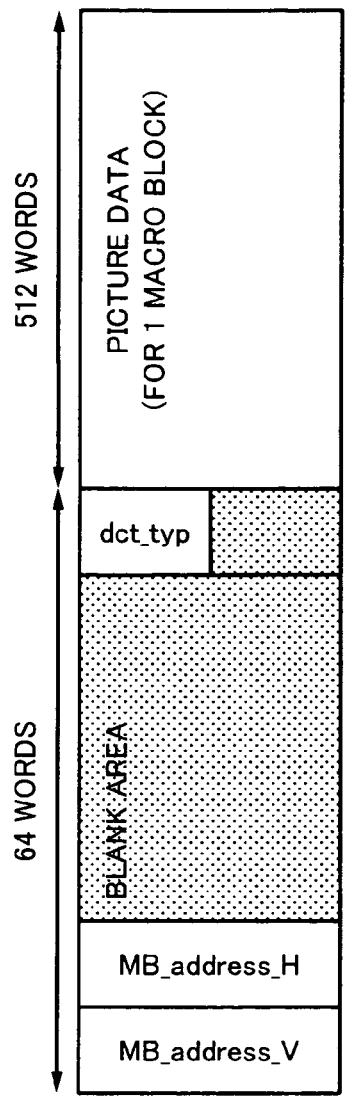

In this case, instead of actually encoding video data, the DCT mode portion 208 calculates the sum of absolute values of difference values of vertically adjacent pixels in both the DCT encoding mode and the frame DCT encoding mode, compares them, and selects the mode whose calculated sum is smaller than the other. The selected result is temporarily placed as DCT mode type data that is a flag in the stream. The flag is transferred to each portion downstream of the DCT mode portion 208. As shown in FIG. 11B, the DCT mode type data dct_type is placed on the rear end side of a blank area of the header portion.

The activity portion 209 performs basically the same process as the forgoing activity portion 205. However, as was described above, the activity portion 209 is to perform the pre-encoding process. Thus, the activity portion 209 calculates an activity of each macro block using data of both the first field and the second field.

Figure 11C:
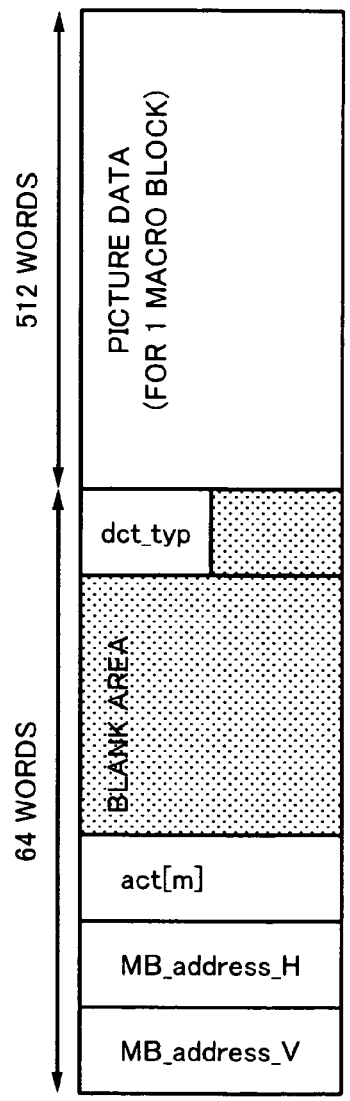

The activity portion 209 first obtains an activity act and places it after a macro block address of the header portion as shown in FIG. 11C. Thereafter, with the activity act and the average value avg_act of the field activity obtained from the forgoing averaging portion 206, the activity portion 209 obtains a normalized activity according to the present invention corresponding to Formula (8) and Formula (9). The activity portion 209 has a structure for calculating a normalized activity norm_act according to the present invention. The structure will be described later.

Figure 12A:
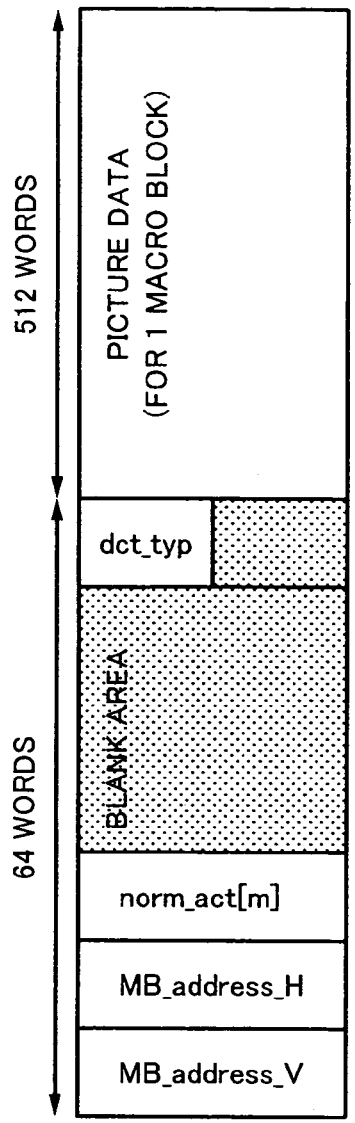
FIG. 12A, FIG. 12B, and FIG. 12C are schematic diagrams showing examples of structures of streams transferred by the individual portions of the MPEG encoder.

The obtained normalized activity norm_act is temporarily placed as a flag in the header portion of the stream as shown in FIG. 12A. The flag is transferred to the individual portions downstream of the averaging portion 206. The activity act is overwritten to the normalized activity data norm_act in the stream.

Figure 12B:
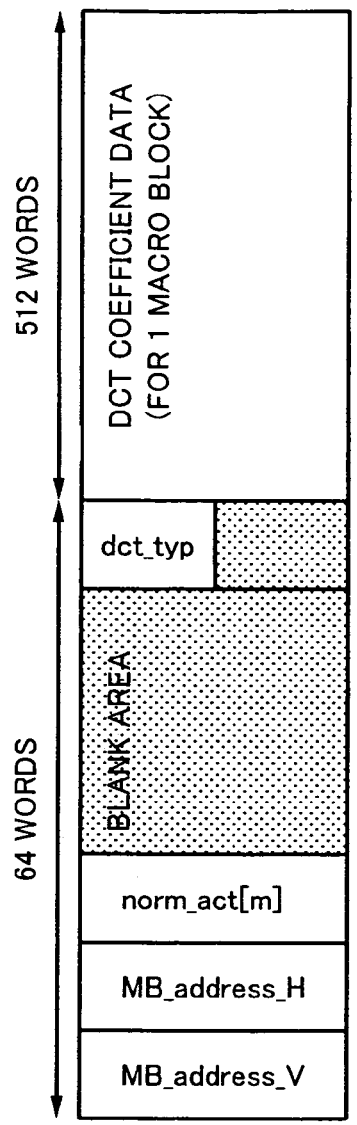

An output of the activity portion 209 is supplied to a DCT portion 210A. The DCT portion 210A divides the supplied macro block into DCT blocks each of which is composed of eight pixels×eight lines, performs the two-dimensional DCT for each DCT block, and generates DCT coefficients. As shown in FIG. 12B, the DCT coefficients are placed in the data portion of the stream and supplied to a quantizer table portion 211A.

Figure 12C:
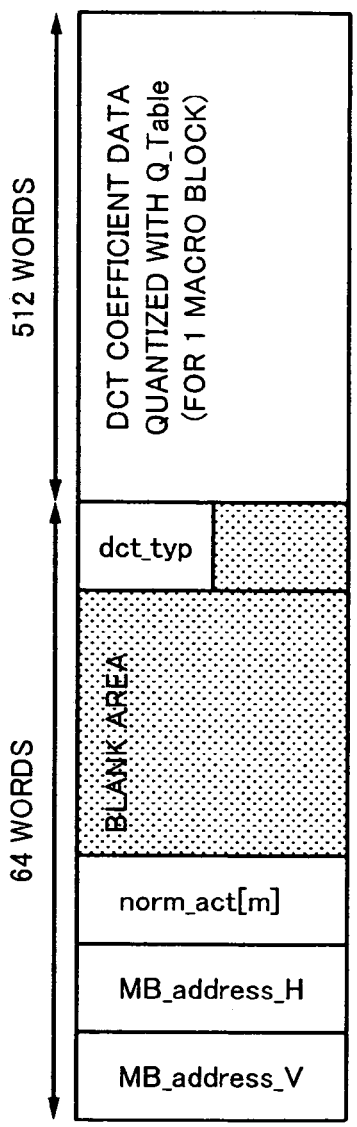

The quantizer table portion 211A quantizes the DCT coefficients, which have been transformed by the DCT portion 210A, with a quantizer matrix (quantizer_matrix). As shown in FIG. 12C, the DCT coefficients, which have been quantized by the quantizer table portion 211A, are placed in the data portion of the stream and then output. An output of the quantizer table portion 211A is supplied to a multi-staged quantizer portion composed of a plurality of Q_n (quantizer) portions 212, 212, . . . , VLC portions 213, 213, . . . , cumulating portions Σ 214, 214, . . . , and cumulating portions Σ 215, 215, . . . The DCT coefficients quantized by the quantizer table portion 211A are quantized on multiple stages of the quantizer portions.

The Q_n portions 212, 212, . . . quantize the DCT coefficients with different quantizer scales (quantizer_scale) Q. The values of the quantizer scales Q are prescribed in for example the MPEG2 standard. The Q_n portions 212, 212, . . . are composed of for example 31 quantizers according to the standard. At that point, since n=31, the Q_n portions 212, 212, . . . are a Q_1 portion, a Q_2 portion, . . . , and a Q_31 portion. With the quantizer scales Qn, the Q_n portions 212 quantize DCT coefficients with the quantizer scales Qn assigned thereto at a total of 31 steps. Hereinafter, the quantizer scale values of the Q_n portions 212, 212, . . . are denoted by the quantizer scales Qn values.

The Q_n portions 212, 212, . . . quantize DCT coefficients with their quantizer scale Qn values. At that point, with the quantizer scale mqaunt, which is in consideration of the visual characteristic, and which has been obtained using mqaunt=Q_n×norm_act with the normalized activity data norm_act obtained by the activity portion 209, the adaptive quantization is performed.

Figure 13A:
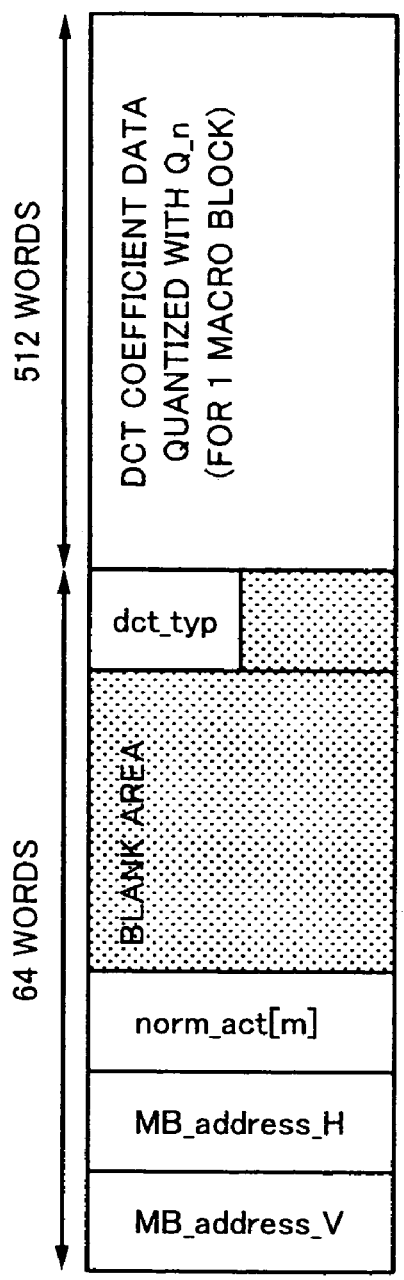
FIG. 13A and FIG. 13B are schematic diagrams showing examples of structures of streams transferred by the individual portions of the MPEG encoder.

The DCT coefficients adaptively quantized by the Q_n portions 212, 212, . . . with the quantizer scales Qn are placed in the data portion of the stream as shown in FIG. 13A and supplied to the VLC portions 213, 213, . . . The VLC portions 213, 213, . . . scan DCT coefficients for the individual quantizer scales Qn according to for example the zigzag scanning method and encodes them with a variable length code with reference to a VLC table according to for example the two-dimensional Huffman code.

Figure 13B:
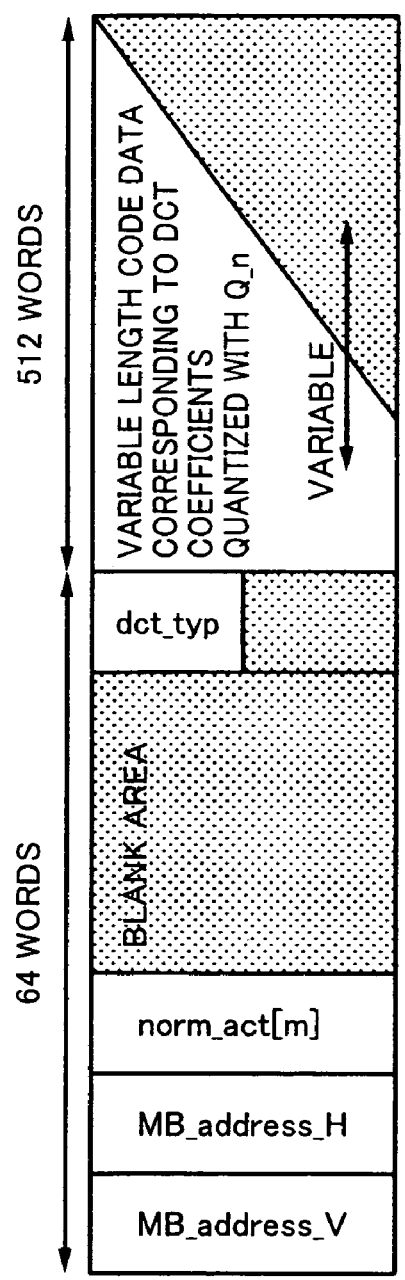
Figures 14A, 14B:
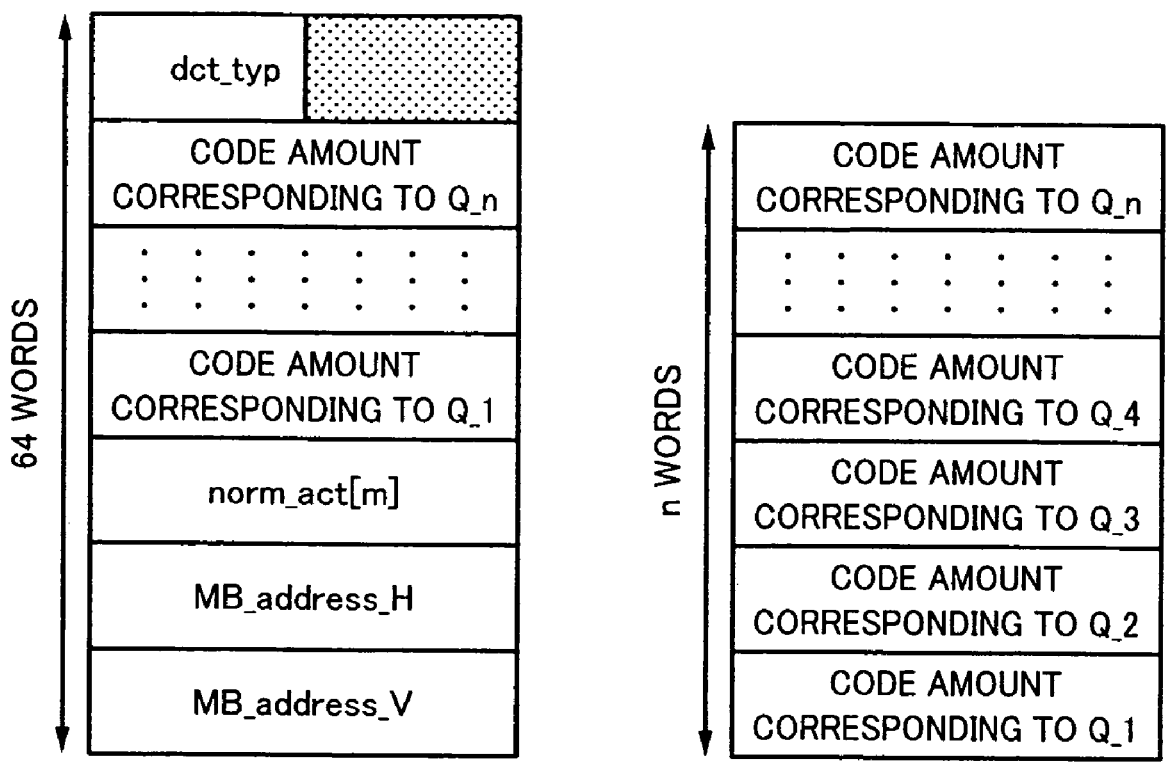
FIG. 14A and FIG. 14B are schematic diagrams showing examples of structures of streams transferred by the individual portions of the MPEG encoder.

The data, which has been encoded with the variable length code by the VLC portions 213, 213, . . . , is placed in the data portion of the stream as shown in FIG. 13B and then output. Outputs of the VLC portions 213, 213, . . . are supplied to the corresponding cumulating portions Σ 214, 214, . . . , The cumulating portions Σ 214, 214, . . . cumulate the generated code amounts for each macro block. As described above, when 31 types of quantizing devices are used, 31 types of generated code amounts are obtained for each macro block. As shown in FIG. 14A, the generated code amounts cumulated by the cumulating portions Σ 214, 214, . . . are placed in the header portion of the stream. In other words, the generated code amounts quantized by the Q_1 portion 212 to Q_n portion 212 for each macro block are placed in the header portion of the stream. The data portion of the stream is deleted. The stream of each macro block is supplied to the main memory 203.

The generated code amounts for each macro block, which have been output from the cumulating portions Σ 214, 214, . . . , are supplied to the respective cumulating portions Σ 215, 215, . . . The cumulating portions Σ 215, 215, . . . select generated code amounts for each macro block quantized with quantizer_scale (=mquant), in which the forgoing visual characteristic has been considered, from those obtained by the cumulating portions Σ 214, 214, . . . and cumulate them for one frame.

The generated code amounts (frame data rates) cumulated by the cumulating portions Σ 215, 215, . . . for the quantizer scales Qn are supplied as an n-word stream as shown in FIG. 14B to a rate controlling portion 217. When 31 types of quantizing devices are used as the forgoing example, corresponding 31 types of generated code amounts for each frame are obtained.

Next, a method for obtaining a generated code amount will be described more practically. For example, "generated code amount of Q_4 portion 212" can be obtained as follows.

For example, in the case
norm_act [1]=1.3
norm_act [2]=1.5
norm_act [3]=0.8
norm_act [4]=1.0
. . . , mqaunt [1]=4×1.3=5.2

The generated code amount of the Q_5 portion 212 is obtained from the header portion of FIG. 14A.

mqaunt [2]=4×1.5=6.0

The generated code amount of the Q_6 portion 212 is obtained from the header portion of FIG. 14A.

mqaunt [3]=4×0.8=3.2

The generated code amount of the Q_3 portion 212 is obtained from the header portion of FIG. 14A.

mqaunt [4]=4×1.0=4.0

The generated code amount of the Q_4 portion 212 is obtained from the header portion of FIG. 14A.

. . .

They are cumulated for one frame. They are performed for each of the Q_1 portion 212 to the Q_n portion 212. As a result, the generated code amount for one frame is obtained.

Next, the encoding process portion 103C will be described. The encoding process portion 103C performs the final encoding process. As described above, the pre-encoding process portion 103B estimates the generated code amounts for one frame in various quantizing operations. The encoding process portion 103C encodes data corresponding to the generated code amount, which has been estimated for one frame so that the generated code amount does not exceed the pre-designated target generated code amount and outputs an MPEG ES.

The data used in the encoding process portion 103C has been stored in the main memory 203. However, as described above, when the generated code amounts for one frame have been estimated in various quantizing operations by the pre-encoding process portion 103B, the encoding process portion 103C can start the process. As described above, the process of each portion of the encoding process portion 103C can be properly started corresponding to a command issued from the timing generator TG 220.

Figure 15A:
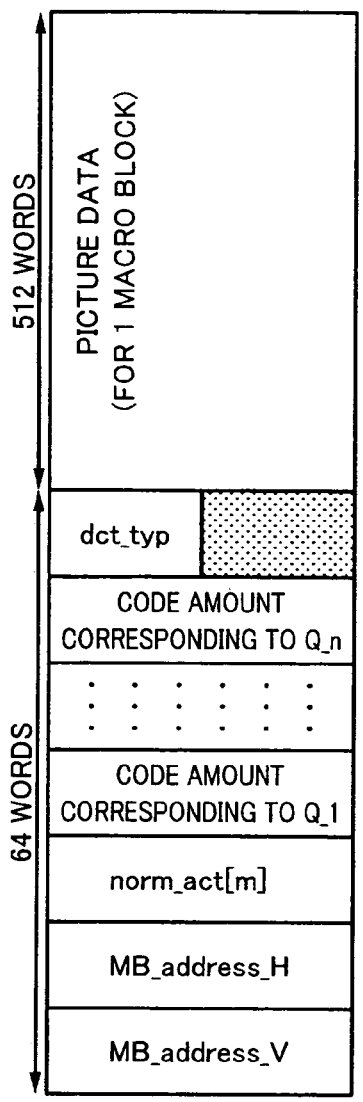
FIG. 15A, FIG. 15B, and FIG. 15C are schematic diagrams showing examples of structures of streams transferred by the individual portions of the MPEG encoder.

Video data that has been read from the main memory 203 is supplied to a raster scan/block scan converting portion 207B. The raster scan/block scan converting portion 207B performs a process similar to the process of the raster scan/block scan converting portion 207A and extracts a macro block of 16 pixels×16 lines from the video data. As shown in FIG. 15A, the extracted macro block is placed in a data portion corresponding to the header portion shown in FIG. 14A and supplied to a DCT mode portion 216.

Figure 15B:
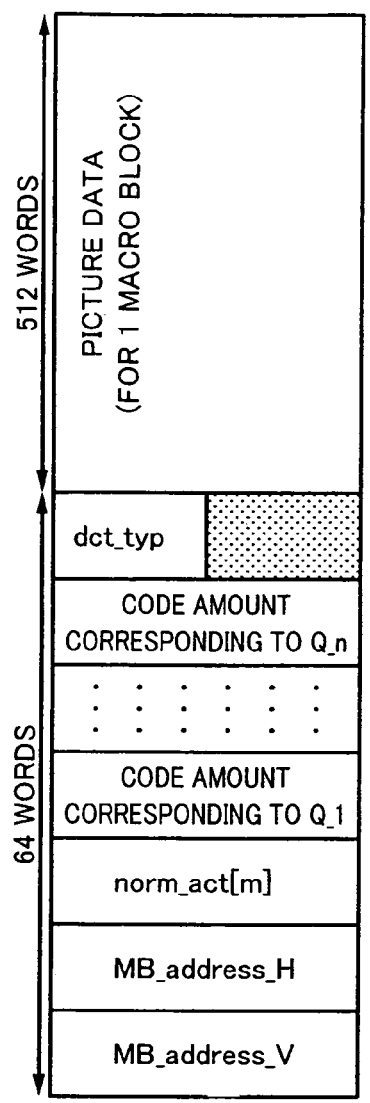

Like the DCT mode portion 208, the DCT mode portion 216 decides to use the field DCT encoding mode or the frame DCT encoding mode to encode data. At that point, the DCT mode portion 208 has decided the DCT mode portion 208 and temporarily placed the result as DCT type data dct_typ in the stream (see FIG. 15A). The DCT mode portion 216 detects the DCT type data dct_typ from the stream and switches to the field encoding mode or the frame encoding mode corresponding to the detected DCT type data dct_typ. An output of the DCT mode portion 216 is shown in FIG. 15B.

Figure 15C:
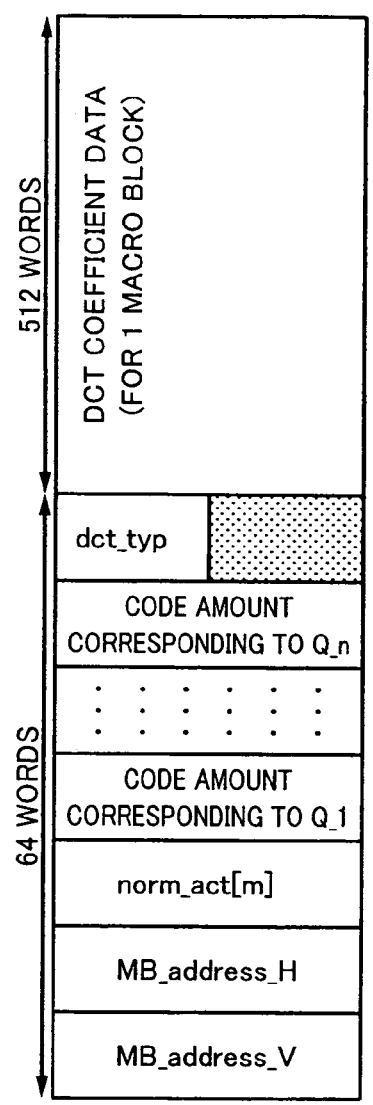

A macro block that has been output from the DCT mode portion 216 is supplied to a DCT portion 210B. Like the DCT portion 210A, the DCT portion 210B two-dimensionally transforms the macro block into DCT coefficients in the unit of one DCT block of eight pixels×eight lines. As shown in FIG. 15C, the DCT coefficients, into which the macro block has been two-dimensionally transformed corresponding to the two-dimensional DCT method, are placed in the data portion of the stream and then output from the DCT portion 210B.

Figure 16A:
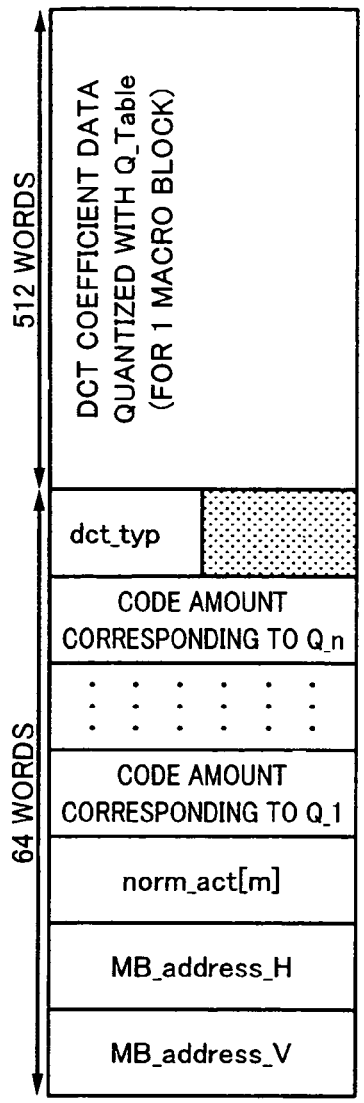
FIG. 16A, FIG. 16B, and FIG. 16C are schematic diagrams showing examples of structures of streams transferred by the individual portions of the MPEG encoder.

A quantizer table portion 211B can be structured in the same manner as the forgoing quantizer table portion 211A. The quantizer table portion 211B quantizes the DCT coefficients transformed by the DCT portion 210B with a quantizer matrix. As shown in FIG. 16A, the DCT coefficients quantized by the quantizer table portion 211B are placed in the data portion of the stream and supplied to a rate controlling portion 217.

The rate controlling portion 217 selects one from the frame data rates, which have been obtained by the cumulating portions Σ 215, 215, . . . of the pre-encoding process portion 103B for each quantizer scale Qn so that the selected one does not exceed the maximum generated code amount per frame designated by the system controller 117 and is the closest to the designated value. The quantizer scale (mquant) for each macro block used in the quantizing device corresponding to the selected frame data rate is obtained from the normalized activity data norm_act placed in the stream and supplied to a quantizing portion 218.

Figure 16B:
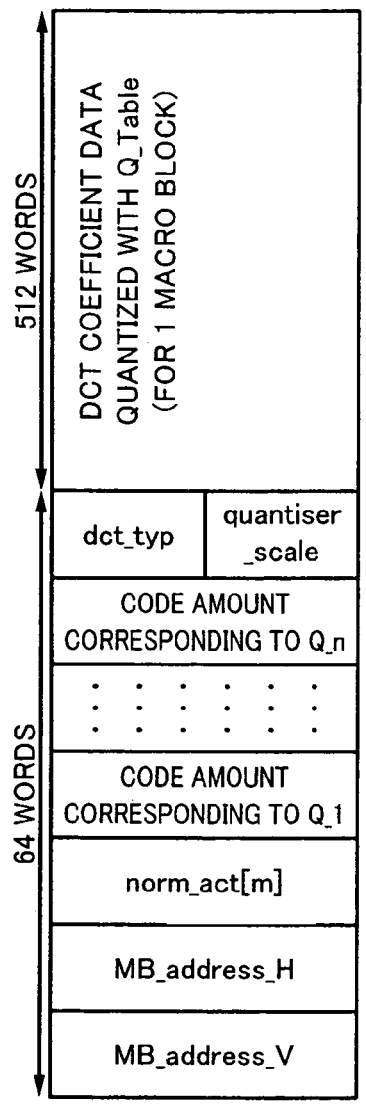

The quantizer scale for each macro block is placed as quantizer_scale on the rear end side of the header portion of the stream as shown in FIG. 16B and then sent to the quantizing portion 218.

The maximum generated code amount per frame is designated by for example the system controller 117 and supplied to the rate controlling portion 217 through the CPU I/F block 221.

At that point, the value of the quantizer scale (mquant) for each macro block can be decreased by one size in the range that does not exceed the difference between the maximum generated code amount per frame, which has been designated by the system controller 117 and transferred through the CPU I/F block 221, and the generated code amount corresponding to the quantizer scale (mquant) for each macro block, which has been obtained from the normalized activity data norm_act placed in the stream. Thus, since a code amount close to the maximum generated code amount designated by the system controller 117 and transferred trough the CPU I/F block 221 is obtained, high picture quality can be accomplished.

The quantizing portion 218 extracts the quantizer scale (quantizer_scale) designated by the rate controlling portion 217 in the forgoing manner from the stream and quantizes DCT coefficients with the quantizer table portion 211B corresponding to the extracted quantizer scale. At that point, since the quantizer scale supplied from the rate controlling portion 217 is the value of the quantizer scale (mquant) obtained from the normalized activity data norm_act, adaptive quantization is performed in consideration of visual characteristic.

Figure 16C:
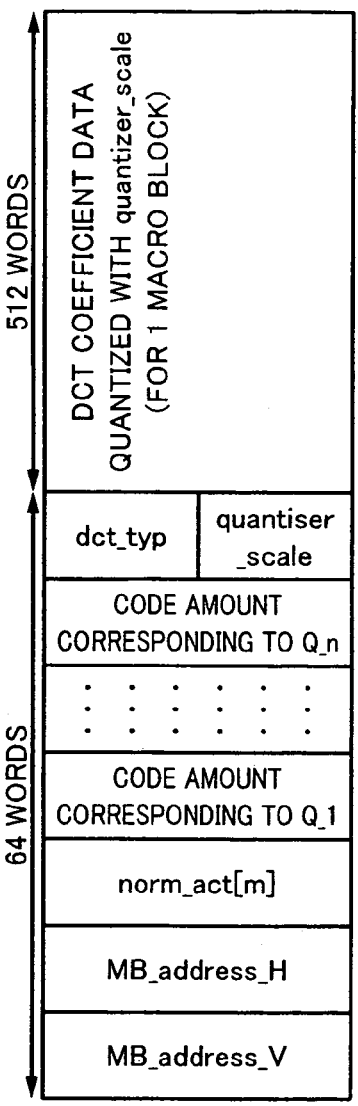

The DCT coefficients quantized by the quantizing portion 218 are placed in the data portion of the stream as shown in FIG. 16C and supplied to a VLC portion 219. The DCT coefficients supplied to the VLC portion 219 are scanned corresponding to for example the zigzag scanning method. The resultant DCT coefficients are encoded with a variable length code with reference to a VLC table according to the two-dimensional Huffman code. The variable length code is bit-shifted so that it is byte-aligned and then output as an MPEG ES.

Figure 17:
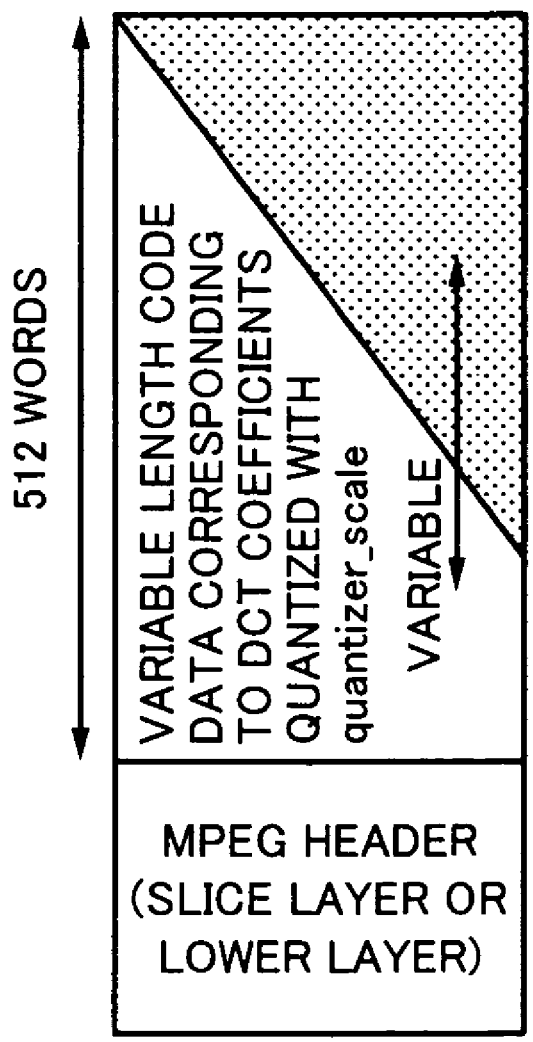
FIG. 17 is a schematic diagram showing an example of structure of a stream transferred by the individual portions of the MPEG encoder.

At that point, as shown in FIG. 17, the header portion as the first half portion of the stream is replaced with the MPEG header portion in which the MPEG header information of the slice layer or below is placed. The variable length code is placed in the data portion on the second half side of the stream.

Figure 18:
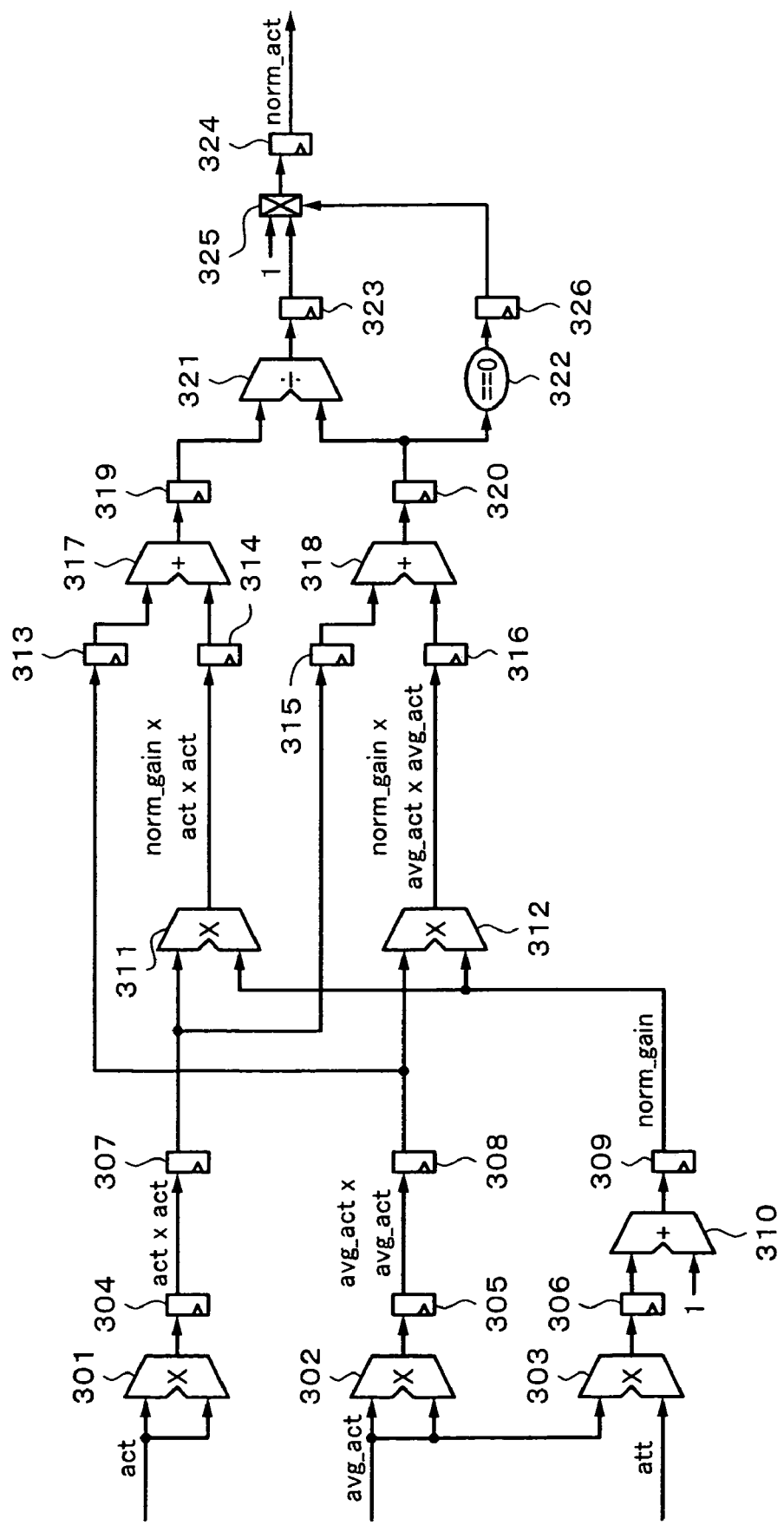
FIG. 18 is a block diagram showing an example of a structure for calculating a normalized activity according to the present invention.

FIG. 18 shows an example of the structure for calculating a normalized activity norm_act according to the present invention. It is assumed that a normalized activity norm_act is calculated corresponding to Formula (8) and Formula (9).

As was described above, the activity portion 209 first obtains an activity act. The activity act is supplied to first and second input terminals of a multiplying device 301. The multiplying device 301 calculates act×act. The calculated result is supplied to a first input terminal of a multiplying device 311 through a register 304 and a register 307. In addition, the calculated result is supplied to a first input terminal of an adding device 318 through a register 315.

An average activity avg_act that is output from the averaging portion 206 is supplied to first and second input terminals of a multiplying device 302. The multiplying device 302 calculates avg_act×avg_act. The calculated result is supplied to a first input terminal of a multiplying device 312 through a register 305 and a register 308. In addition, the calculated result is supplied to a first input terminal of an adding device 317 through a register 313.

An average activity avg_act that is output from the averaging portion 206 is also supplied to a first input terminal of a multiplying device 303. A parameter att is supplied to a second input terminal of the multiplying device 303. The parameter att is designated by for example the system controller 117 and supplied toe the multiplying device 303 through a CPU I/F 221. The calculated result of the multiplying device 303 is supplied to a first input terminal of an adding device 310 through a register 306. A constant "1" is supplied to a second input terminal of the adding device 310. The multiplying device 303 and the adding device 310 calculates att×avg_act+1 and obtains norm_gain. The obtained result norm_gain is supplied to second input terminals of the multiplying device 311 and a multiplying device 312 through a register 309.

The multiplying device 311 calculates norm_gain×(act× act). The calculated result is supplied to a second input terminal of the adding device 317 through a register 314. The adding device 317 calculates avg_act×avg_act+norm_gain×(act×act). The calculated result is supplied to a dividend input terminal of a dividing device 321 through a register 319.

Likewise, the multiplying device 312 calculates norm_gain×(avg_act×avg_act). The calculated result is supplied to a second input terminal of the adding device 318 through a register 316. The adding device 318 calculates norm_gain×(avg_act×avg_act)+act×act. The calculated result is supplied to a divisor input terminal of the dividing device 321 through a register 320.

The dividing device 321 calculates {avg_act×avg_act+ norm_gain×(act×act)}÷{norm_gain×(avg_act×avg_act)+ act×act}. In other words, an output of the dividing device 321 is a normalized activity norm_act according to an embodiment of the present invention. The normalized activity norm_act that is output from the multiplying device 312 is output through a selector 325 and a register 324. In the stream, the normalized activity norm_act overwrites the activity act shown in FIG. 11C. The normalized activity norm_act is buried in the stream as shown in FIG. 12A and transferred to individual downstream portions.

A comparing portion 322 monitors the value (divisor) supplied to the register 320. When the divisor is "0", for example a flag representing that is supplied to the selector 325 through a register 326. An output of the dividing device 321 is supplied to a first input terminal of the selector 325. A constant "1" is supplied to a second input terminal of the selector 325. When the flag supplied from the comparing portion 322 represents that the divisor is "0", the selector selects the constant "1" and outputs the normalized activity norm_act.

The forgoing example shows that the process of the MPEG encoder 103 is implemented by hardware. However, according to the present invention, the process of the MPEG encoder 103 is not limited to such an example. In other words, the process of the MPEG encoder 103 can be implemented by software. In this case, for example, a computer apparatus is provided with analog and digital interfaces for a video signal. Software installed on the computer is executed with a CPU and a memory. In the forgoing digital VTR structure, the CPU and memory may be substituted for the MPEG encoder 103.

The software is recorded as program data on a recording medium such as a CD-ROM (Compact Disc-Read Only Memory). The recording medium, on which the software has been recorded, is loaded to the computer apparatus. With a predetermined operation, the software is installed onto the computer apparatus. As a result, the process of the software can be executed. Since the structure of the computer apparatus is well known, its description will be omitted in the following.

Figure 19:
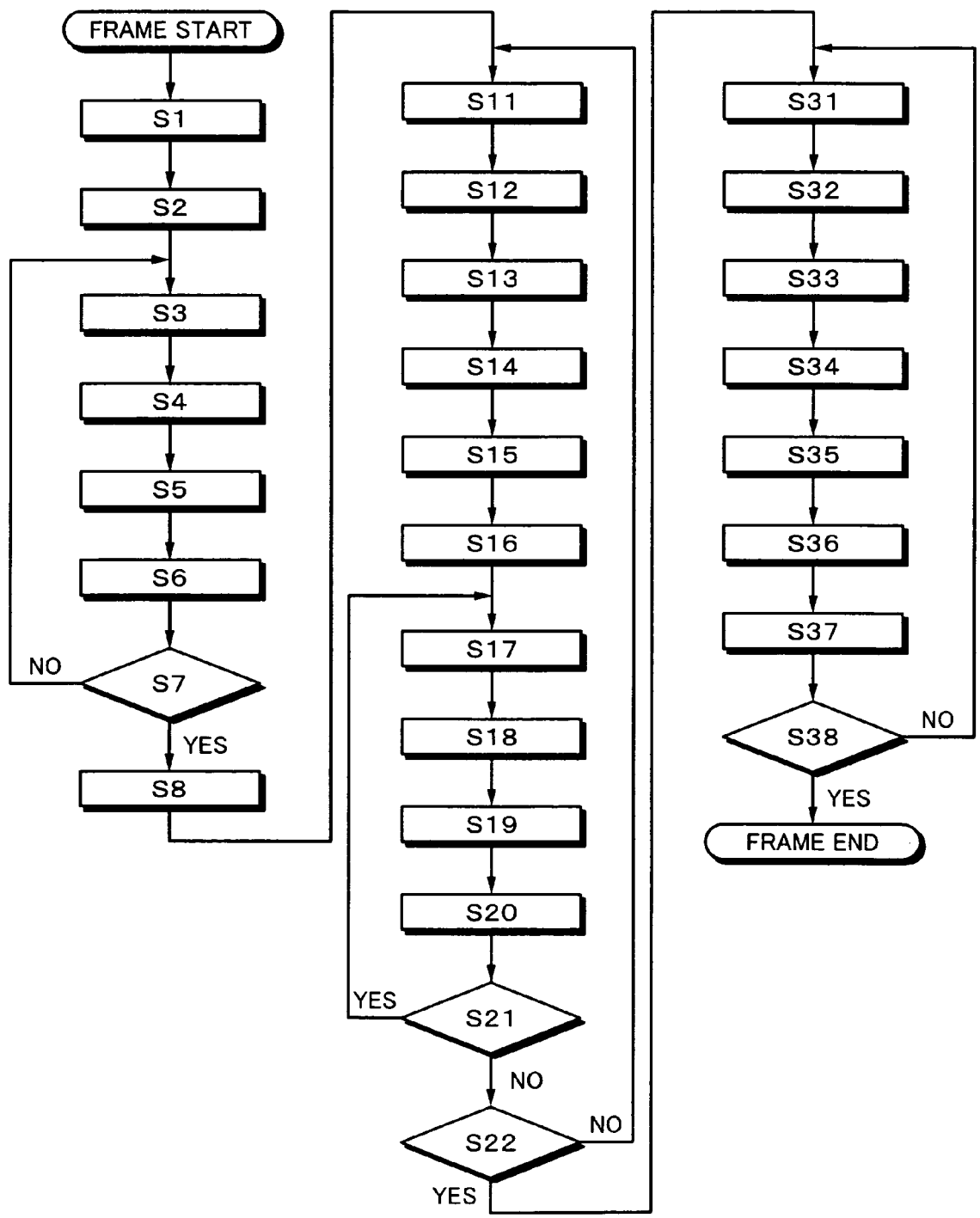
FIG. 19 is a flow chart showing an example of which a process of the MPEG encoder is implemented by software.

FIG. 19 is a flow chart showing an example of the process of the MPEG encoder 103 implemented by software. Since the process of the flow chart is the same as the process implemented by the forgoing hardware, the process of the flow chart will be briefly described in consideration of the process implemented by hardware. Steps S1 to S7 correspond to the process of the forgoing input field activity averaging process portion 103A. Steps S11 to S21 correspond to the process of the forgoing pre-encoding process portion 103B. Steps S31 to S38 correspond to the process of the forgoing encoding process portion 103C.

At step S1, the first step, video data is captured. At step S2, the next step, each header of the MPEG is extracted in the vertical blanking region and stored in a memory. In other than the vertical blanking region, the captured video data is stored in the memory.

At step S3, video data is converted from raster scan data into block scan data. As a result, a macro block is extracted. This operation is performed by controlling read addresses of the video data stored in the memory. At step S4, an activity of each macro block of the first field of the video data is calculated. At step S5, the obtained activities Activity (act) are cumulated and stored as the cumulated value sum to the memory. The process from steps S3 to S5 is repeated until it has been determined that the last macro block of the first field has been processed at step S6. In other words, the cumulated value sum is the sum of activities of macro blocks for one field.

When it has been determined that the last macro block of one field has been processed at step S6, the cumulated value stored in the memory is divided by the number of macro blocks for one field at step S7. As a result, the average value Activity (avg_act) of the field activities for the field is obtained and stored in the memory.

When the average value Activity (avg_act) of the field activities has been obtained, the flow advances to step S11. Like at step S3, at step S11, the video data stored in the memory is converted from raster scan data into block scan data. As a result, a macro block is extracted. At step S12, the field DCT encoding mode or the frame DCT encoding mode is selected. The selected result is stored as DCT mode type data dct_typ in the memory.

At step S13, with both the first and second fields, an activity act of each macro block is calculated. With the activities act and the average value Activity (avg_act) of the field activities obtained and stored in the memory at step S7, a normalized activity Activity (norm_act) of the present invention according to Formula (8) and Formula (9) is obtained. The obtained normalized activity Activity (norm_act) is stored in the memory.

The forgoing Formula (8) and Formula (9) can be expressed by software using C language, which is a programming language. In the following expression, "MB_num" represents the total number of macro blocks of one frame. In addition, a parameter att is constant. For example, att=0.125.

```
norm_gain = att × avg_act + 1
for (m = = 0; m < MB_num; m++ ) {
    if ((act [m] = = 0) && (avg_act = = 0))
        norm_act [m] = 1
    else
        norm_act [m] = ((norm_gain × act [m] ×
act [m]) + (avg_act × avg_act)) ÷ ((act [m] × act [m])
+ (norm_gain × avg_act × avg_act))
} /* next macroblock */
```

At step S13, a normalized activity Activity (norm_act) is obtained corresponding to for example such a program.

At step S14, a macro block extracted from the video data at step S11 is divided into DCT blocks each of which is composed of eight pixels×eight pixels. Each DCT block is two-dimensionally transformed in the two-dimensional DCT method. As a result, DCT coefficients are obtained. At step S15, the DCT coefficients are quantized with a quantizer table (quantizer_table). Thereafter, the flow advances to step S16.

The process from steps S16 to S20 is repeated with each quantizer scale (quantizer_scale) Qn value. As a result, the processes corresponding to the forgoing Q_n portions 212, 212, . . . , the forgoing VLC portions 213, 213, . . . , the forgoing cumulating portions Σ 214, 214, . . . , and the forgoing cumulating portions Σ 215, 215, . . . In other words, at step S16, the DCT coefficients are quantized with quantizer scale Q=1. At step S17, the DCT coefficients quantized with reference to the VLC table are encoded with a variable length code. At step S19, the generated code amount of the macro block with the variable length code is calculated. At step S19, the generated code amount of each macro block obtained at step S18 is cumulated for one frame. At step S20, it is determined whether or not there is another quantizer scale Qn. When it has been determined that there is another quantizer scale Qn, the flow returns to step S16. At step S16, the process for the other quantizer scale Qn is performed. The generated code amounts corresponding to the individual quantizer scales Qn for one frame are stored in the memory.

When it has been determined that the cumulated value of the generated code amounts corresponding to all the quantizer scale values Qn for one frame has been obtained at step S20, the flow advances to step S21. At step S21, it is determined whether or not the last macro block (MB) of one frame has been processed. When the last macro block has not been processed, the flow returns to step S11. When the last macro block has been processed and the generated code amount for one frame has been estimated, the flow advances to step S31. At step S31, the real encoding process is performed.

Like at S11, at step S31, video data stored in the memory is converted from raster scan data into block scan data. As a result, a macro block is extracted. At step S32, corresponding to the DCT mode type data dct_typ stored in the memory at step S12, the DCT encoding mode is designated.

At step S33, the macro block extracted from the video data at step S31 is divided into DCT blocks each of which is composed of eight pixels×eight lines. Each DCT block is two-dimensionally transformed according to the two-dimensional DCT method. As a result, DCT coefficients are obtained. The DCT coefficients are quantized with the quantizer table (quantizer_table) at step S34. Thereafter, the flow advances to step S35.

At step S35, corresponding to the generated code amounts of the quantizer scales Qn, which have been estimated at steps S11 to S21, for one frame, the quantizer scales Qn used at step S36 are designated for each macro block so as to control the generated code amount in the real encoding process.

Thereafter, the flow advances to step S36. With the quantizer scales Qn designated at step S35, the DCT coefficients quantized with the quantizer table at step S34 are quantized. With reference to the VLC table, the DCT coefficients quantized at step S36 are encoded with a variable length code at step S37. At step S38, it is determined whether or not the last macro block of one frame has been processed. When it has been determined that the last macro block of one frame has not been processed, the flow returns to step S31. At step S31, the quantizing process and the variable length code encoding process are performed for the next macro block. In contrast, when it has been determined that the last macro block of one frame has been processed at step S38, the encoding process for one frame has been completed.

The forgoing example shows that the pre-encoding process from steps S11 to S21 is different from the encoding process from steps S31 to S38. However, it should be noted that the present invention is not limited to such an example. For example, the generated code amounts estimated at steps S11 to S21 are stored in the memory. Data that is obtained by the real encoding process is selected from the stored data. As a result, the process from steps S31 to S38 can be contained as a loop in the process from steps S11 to S21.

In the forgoing description, the value of the parameter att is "0.125". However, the present invention is not limited to such an example. In other words, the parameter att may be another value. When the value of the parameter att is varied, the adaptive quantization can be performed corresponding to various compression rates.

As was described above, according to the embodiment of the present invention, when a normalized activity is calculated, the normalizing range is varied corresponding to a characteristic such as flatness and complexity of an objective picture—namely, an average activity of the picture.

Thus, when a picture is wholly flat, the normalizing range of activities is narrowed. With activities that are almost equal in the whole picture, it can be quantized. Thus, with equal flatness in the whole picture, a high picture quality can be obtained.

In contrast, when a picture has both a complex region and a flat region, the normalizing range of activities is widened. A large code amount is assigned to a flat region so that it is finely quantized. A complex region is coarsely quantized. As a result, a visually high quality picture can be obtained.

The invention claimed is:

1. A picture processing apparatus, comprising:
average activity calculating means for calculating an average activity with picture data;
setting means for dynamically setting a normalizing range so that the normalizing range becomes continuously narrow after the average activity becomes continuously small and dynamically setting a normalizing range so that the normalizing range becomes continuously wide after the average activity becomes continuously large;
normalized activity calculating means for calculating a normalized activity for each block into which the picture data is divided in the normalizing range set by setting means according to the average activity and an activity for each block; and
quantizing means for quantizing the picture data with the normalized activity calculated by the normalized activity calculating means.

2. The picture processing apparatus as set forth in claim 1,
wherein the normalized activity for each block is a value obtained by dividing the sum of the result of multiplying a coefficient proportional to the average activity by the activity for each block and the average activity by the sum of the result of multiplying the coefficient by the average activity and the activity for each block.

3. The picture processing apparatus as set forth in claim 2,
wherein when both the value of an activity of each block and the value of the average activity are 0, the normalized activity calculating means calculates the value of the normalized activity as 1.

4. The picture processing apparatus as set forth in claim 1,
wherein the normalized activity for each block is a value obtained by dividing the sum of the result of multiplying a coefficient proportional to the average activity by the activity for each block squared and the average activity squared by the sum of the result of multiplying the coefficient by the average activity squared and the activity for each block squared.

5. The picture processing apparatus as set forth in claim 4,
wherein when both the value of an activity of each block and the value of the average activity are 0, the normalized activity calculating means calculates the value of the normalized activity as 1.

6. The picture processing apparatus as set forth in claim 1,
wherein the normalized activity calculating means calculates the average activity of one frame with the picture data of the first field of the one frame.

7. A picture processing method, comprising the steps of:
calculating an average activity with picture data;
dynamically setting a normalizing range so that the normalizing range becomes continuously narrow after the average activity becomes continuously small and dynamically setting a normalizing range so that the normalizing range becomes continuously wide after the average activity becomes continuously large;
calculating a normalized activity for each block into which the picture data is divided in the normalizing range set by setting means according to the average activity and an activity for each block;
quantizing the picture data with the normalized activity calculated at the normalized activity calculating step.

8. A picture processing program for causing a computer apparatus to execute a picture processing method for quantizing picture data, the picture processing method comprising the steps of:
calculating an average activity with picture data;
dynamically setting a normalizing range so that the normalizing range becomes continuously narrow after the average activity becomes continuously small and dynamically setting a normalizing range so that the normalizing range becomes continuously wide after the average activity becomes continuously large;
calculating a normalized activity for each block into which the picture data is divided in the normalizing range set by setting means according to the average activity and an activity for each block; and quantizing the picture data with the normalized activity calculated at the normalized activity calculating step.

9. A recording medium on which picture processing program for causing a computer apparatus to execute a picture processing method for quantizing picture data is recorded, the picture processing method comprising the steps of:

calculating an average activity with picture data;

dynamically setting a normalizing range so that the normalizing range becomes continuously narrow after the average activity becomes continuously small and dynamically setting a normalizing range so that the normalizing range becomes continuously wide after the average activity becomes continuously large;

calculating a normalized activity for each block into which the picture data is divided in the normalizing range set by setting means according to the average activity and an activity for each block; and quantizing the picture data with the normalized activity calculated at the normalized activity calculating step.

10. A picture processing apparatus, comprising:

an average activity calculating unit configured to calculate an average activity with picture data;

a setting unit for dynamically setting a normalizing range so that the normalizing range becomes continuously narrow after the average activity becomes continuously small and dynamically setting a normalizing range so that the normalizing range becomes continuously wide after the average activity becomes continuously large;

a normalized activity calculating unit for calculating a normalized activity for each block into which the picture data is divided in the normalizing range set by setting means according to the average activity and an activity for each block; a normalized activity calculating unit configured to dynamically designate a normalizing range according to the average activity calculated by the average activity calculating unit and calculating a normalized activity with the average activity in the normalizing range; and a quantizing unit configured to quantize the picture data with the normalized activity calculated by the normalized activity calculating unit.

11. The picture processing apparatus as set forth in claim 10, further comprising:

an activity calculating unit for calculating activity for each block.

12. The picture processing apparatus as set forth in claim 10, wherein the normalized activity for each block is a value obtained by dividing the sum of the result of multiplying a coefficient proportional to the average activity by the activity for each block and the average activity by the sum of the result of multiplying the coefficient by the average activity and the activity for each block.

13. The picture processing apparatus as set forth in claim 12, wherein when both the value of an activity of each block and the value of the average activity are 0, the normalized activity calculating unit calculates the value of the normalized activity as 1.

14. The picture processing apparatus as set forth in claim 10, wherein the normalized activity for each block is a value obtained by dividing the sum of the result of multiplying a coefficient proportional to the average activity by the activity for each block squared and the average activity squared by the sum of the result of multiplying the coefficient by the average activity squared and the activity for each block squared.

15. The picture processing apparatus as set forth in claim 14, wherein when both the value of an activity of each block and the value of the average activity are 0, the normalized activity calculating unit calculates the value of the normalized activity as 1.

16. The picture processing apparatus as set forth in claim 10, wherein the normalized activity calculating unit calculates the average activity of one frame with the picture data of the first field of the one frame.

17. The picture processing apparatus as set forth in claim 1, further comprising:

activity calculating means for calculating activity for each block.

* * * * *